(12) United States Patent
Ibrahim et al.

(10) Patent No.: US 8,320,844 B2
(45) Date of Patent: Nov. 27, 2012

(54) CONFIGURABLE TRANSCEIVER INTEGRATED CIRCUIT

(75) Inventors: Brima B. Ibrahim, Aliso Viejo, CA (US); Arya Reza Behzad, Poway, CA (US); Vinko Erceg, Cardiff By The Sea, CA (US); John Walley, Ladera Ranch, CA (US); Jeyhan Karaoguz, Irvine, CA (US); David Rosmann, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 564 days.

(21) Appl. No.: 12/504,756

(22) Filed: Jul. 17, 2009

(65) Prior Publication Data

US 2011/0013677 A1    Jan. 20, 2011

(51) Int. Cl.
*H04B 1/40* (2006.01)
(52) U.S. Cl. ........................................ 455/84; 455/552.1

(58) Field of Classification Search ................... 455/74, 455/78, 82, 83, 84, 550.1, 552.1, 553.1, 180.1, 455/575.7; 333/100, 101
See application file for complete search history.

(56) References Cited

U.S. PATENT DOCUMENTS

| | | |
|---|---|---|
| 2004/0266378 A1* | 12/2004 | Fukamachi et al. ........ 455/188.1 |
| 2006/0232358 A1* | 10/2006 | Jedeloo ........................ 333/103 |
| 2009/0117858 A1* | 5/2009 | Furrer et al. .................... 455/78 |

* cited by examiner

*Primary Examiner* — Ping Hsieh
(74) *Attorney, Agent, or Firm* — Garlick & Markison; Bruce E. Garlick

(57) ABSTRACT

A configurable radio frequency (RF) transceiver integrated circuit (IC) includes an RF input/output (IO) module, a plurality of switching modules, and a plurality of components. The RF IO module and selected components of the plurality of components are inter-connected via the at least some of the plurality of switching modules based on a configuration instruction to produce at least one of: at least a portion of a receiver and at least a portion of transmitter.

20 Claims, 16 Drawing Sheets

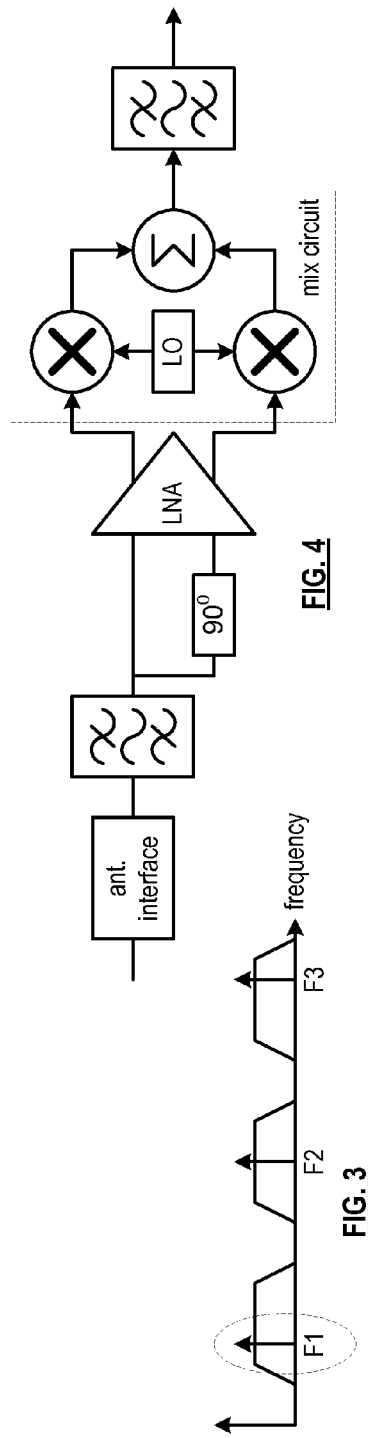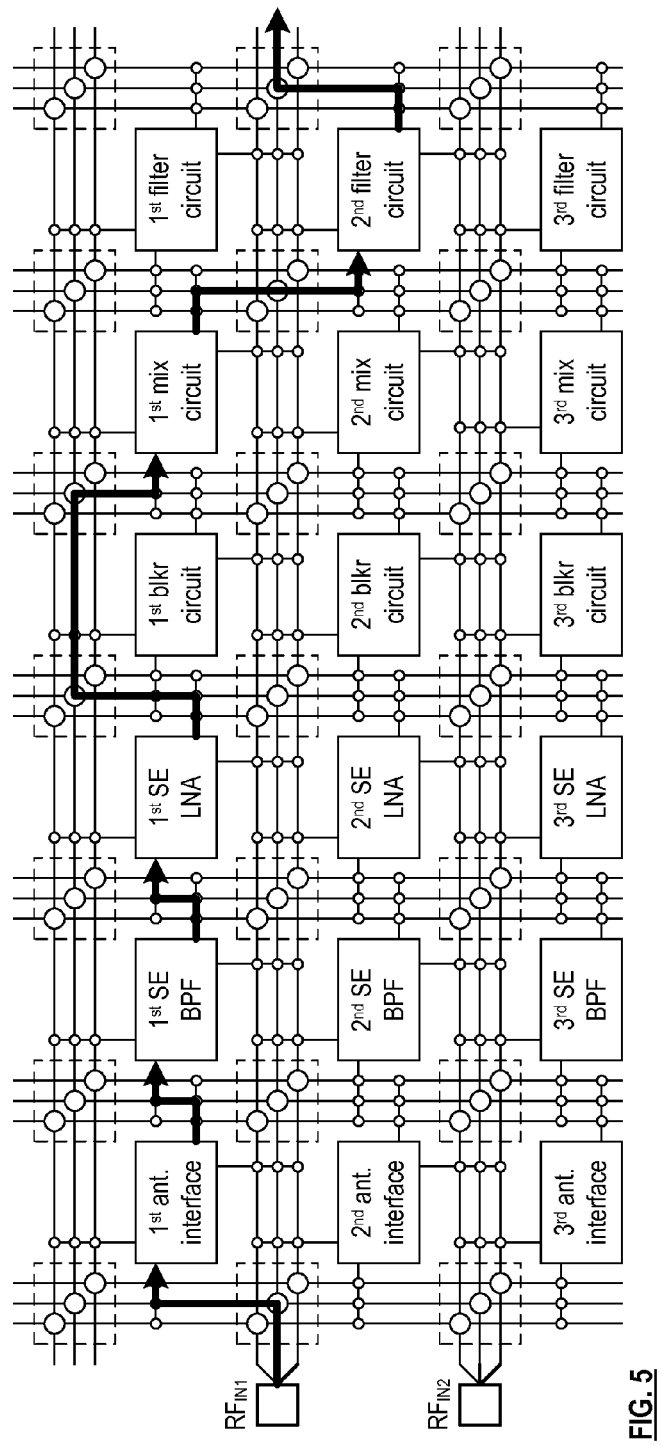

CONFIGURABLE TRANSCEIVER INTEGRATED CIRCUIT

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to transceivers that operate in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Many wireless transceivers are able to support multiple communication standards, which may be in the same frequency band or in different frequency bands. For example, a wireless transceiver may support Bluetooth communications for a personal area network and IEEE 802.11 communications for a Wireless Local Area Network (WLAN). In this example, the IEEE 802.11 communications and the Bluetooth communications may be within the same frequency band (e.g., 2.4 GHz for IEEE 802.11b, g, etc.). Alternatively, the IEEE 802.11 communications may be in a different frequency band (e.g., 5 GHz) than the Bluetooth communications (e.g., 2.4 GHz). For Bluetooth communications and IEEE 802.11b, (g), etc. communications there are interactive protocols that appear to the user as simultaneous implementation, but is actually a shared serial implementation. As such, while a wireless transceiver supports multiple types of standardized communications, it can only support one type of standardized communication at a time.

In addition, a transceiver that supports multiple standards includes multiple radio frequency (RF) front-ends (e.g., on the receiver side, separate LNA, channel filter, and IF stages for each standard and, on the transmitter side, separate IF stages, power amplifiers, and channels filters for each standard). As such, multiple standard transceivers include multiple separate RF front-ends; one for each standard in a different frequency band, channel utilization scheme (e.g., time division multiple access, frequency division multiple access, code division multiple access, orthogonal frequency division multiplexing, etc.), and/or data modulation scheme (e.g., phase shift keying, frequency shift keying, amplitude shift keying, combinations and/or variations thereof). Such multiple transceivers are fixed in that they can only support standards to which they were designed. Thus, as a new standard is released, new hardware may be needed for a wireless communication device to support the newly released standard.

Further, transceivers that support full duplex communications require a technique to minimize the adverse affects of transmissions upon receptions of RF signals. Many standards account for this by providing a transmission frequency and a reception frequency (e.g., 1920-1980 MHz for uplink WCDMA communications and 2110-2170 MHz for downlink WCDMA communications). While standardized transmission and reception frequencies eliminate direct overlap, the transmitted signal still adversely affects the received signal when the signal strength difference is substantial (e.g., 60 dBm or more). In this instance, further reduction of the transmit signal is needed within the receiver section, which may be achieved by using a duplexer and/or blocking In a multiple standard transceiver, such conventional approaches may not provide sufficient reduction of the transmit signal.

Therefore, a need exists for a transceiver that is capable of at least partially overcoming one or more of the above mentioned multiple standard limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 3 is a diagram of an example of multiple frequency bands that support multiple standards in accordance with the present invention;

FIG. 4 is a schematic block diagram of an example of a configured RF receiver section in accordance with the present invention;

FIG. 5 is a schematic block diagram of a configuration example of the configured RF receiver section in accordance with the present invention;

DETAILED DESCRIPTION OF THE INVENTION

Figure 1:
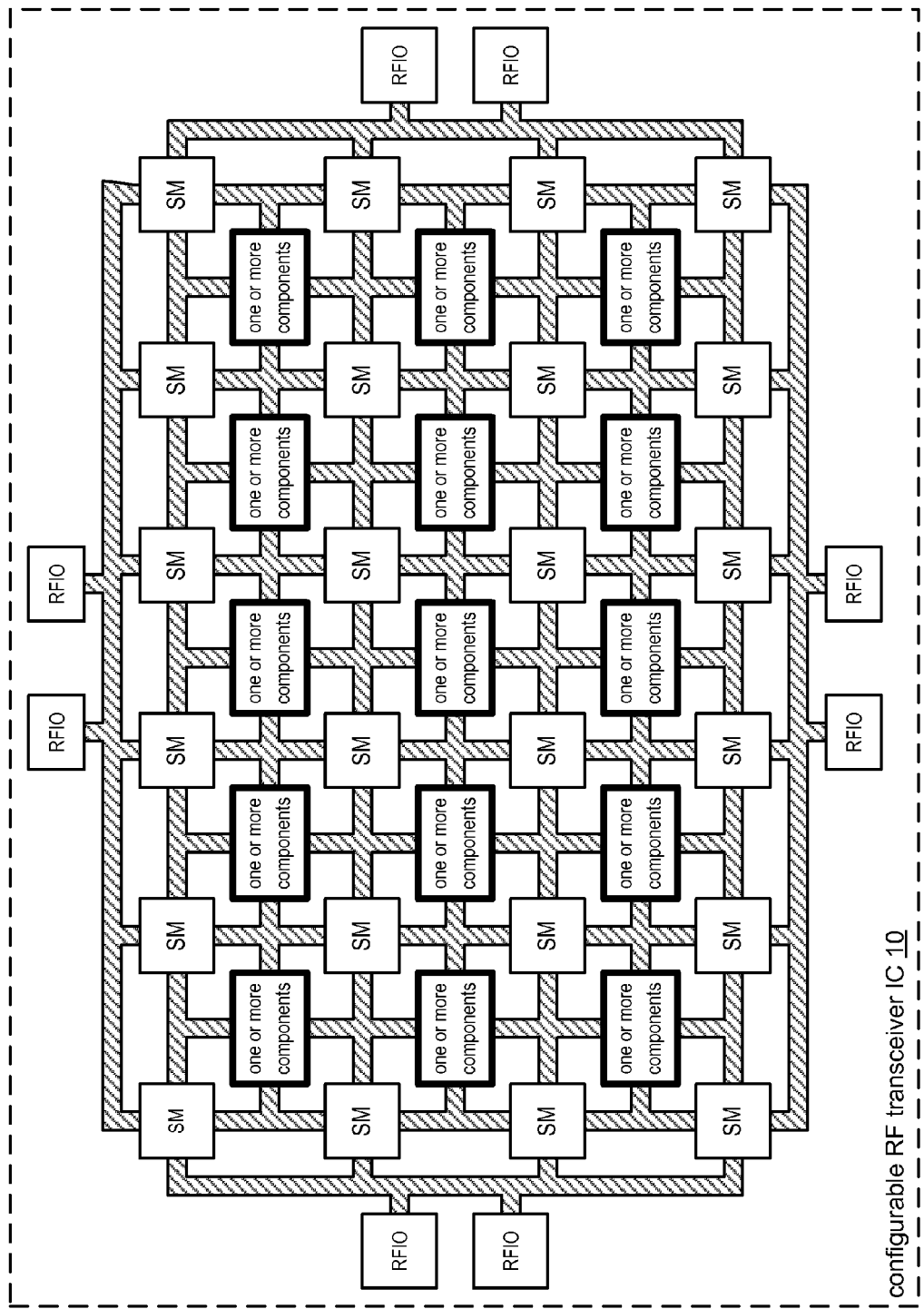
FIG. 1 is a schematic block diagram of an embodiment of a configurable RF transceiver IC in accordance with the present invention.

FIG. 1 is a schematic block diagram of an embodiment of a configurable radio frequency (RF) transceiver integrated circuit (IC) 10 that includes a plurality of switching modules (SM), a plurality of components, and at least one RF input/output module (RFIO). The configurable RF transceiver IC 10 may be configured to provide one or more receivers and/or one or more transmitters that are compliant with one or more of a plurality of wireless communication standards. The wireless communication standards include, but are not limited to, IEEE 802.11, Bluetooth, ZigBee, CDMA, WCDMA, GSM, EDGE, GPRS, high-speed downlink packet access (HSDPA), high-speed uplink packet access (HSUPA), variations thereof, and/or future versions thereof. In addition, the configurable RF transceiver IC 10 may be configured for non-standardized or future standard communications such as 60 GHz wireless communications.

The plurality of components includes a plurality of receiver components, a plurality of transmitter components, and/or a plurality of common components. The plurality of receiver components may include one or more low noise amplifiers, one or more receiver antenna interface circuits, one or more channel selection or RF bandpass filters (single-ended and/or differential), one or more blocking circuits, one or more mixing circuits, one or more intermediate frequency (IF) filters, one or more low IF or baseband filters, and/or one or more receiver single-ended to differential converters (e.g., a transformer balun). The plurality of transmitter components may include one or more transmitter antenna interface circuits, one or more channel selection or RF bandpass filters, one or more power amplifiers and/or power amplifier drivers, one or more mixers, one or more phase locked loops, one or more segregation modules, one or more normalizing modules, one or more IF filters, and/or one or more low IF or baseband filters. The plurality of common components may include one or more antenna interface circuits, one or more transmit receive switches, one or more transformer baluns, one or more RF bandpass filters, and/or one or more duplexers.

In addition, the plurality of components may include a plurality of fixed circuits, a plurality of adjustable circuits, and/or a plurality of circuit elements. For example, an RF bandpass filter may be a fixed circuit (i.e., have a fixed gain, fixed roll-off, and fixed corner frequencies) or an adjustable circuit (i.e., have an adjustable gain, an adjustable roll-off, and/or an adjustable corner frequencies). As another example, a circuit element may be a resistor, capacitor, inductor, transistor, etc. that may be combined with other circuit elements to form a circuit (e.g., a filter) or used in combination with a fixed or adjustable circuit to change the properties (e.g., gain, bandwidth, frequency, etc.) of the circuit, to buffer an input or output of a circuit, etc.

In operation, the configurable RF transceiver IC 10 receives a configuration instruction from a processing module. The processing module may be on chip with the RF transceiver or off chip. The configuration instruction provides coupling information such that the RF IO module (RFIO) and selected components of the plurality of components are inter-connected via the at least some of the plurality of switching modules to produce at least a portion of a receiver and/or at least a portion of transmitter. As an example, the configuration instruction may be comparable to a configuration instruction used to program a field programmable gate array (FPGA), complex programmable logic device (CPLD), and/or other programmable logic device or gate array.

In addition, the configurable RF transceiver IC 10 may receive a second configuration instruction from the processing module. The second configuration instruction provides coupling information such that a second RF IO module (RFIO) and second selected components of the plurality of components are inter-connected via the at least a second some of the plurality of switching modules to produce at least a portion of a second receiver and/or at least a portion of second transmitter. In this instance, the configurable RF transceiver IC 10 is provided two or more transceivers, where each of the transceivers supports a wireless communication standard in one or more frequency bands. For example, one transceiver may be used to support a Bluetooth communication in the 2.4 GHz frequency band and a second transceiver may be used to support a GSM communication in the 1800 or 1900 MHz frequency band.

The configurable RF transceiver IC 10 may also be configured to provide at least a portion of a MIMO (Multiple Input Multiple Output) transceiver. For instance, the IC 10 may receive from the processing module a MIMO configuration information that provides coupling information such that the RF IO module, the second RF IO module, and MIMO selected components of the plurality of components are inter-connected via at least some of the plurality of switching modules to produce the at least a portion of a MIMO transceiver. Note that the IC 10 may be simultaneously configured to provide two or more MIMO transceivers, or portions thereof, provide a MIMO transceiver and at least one other transceiver, and/or provide any other combination of transceivers or portions thereof to support one or more standards in one or more frequency bands.

Figure 2:
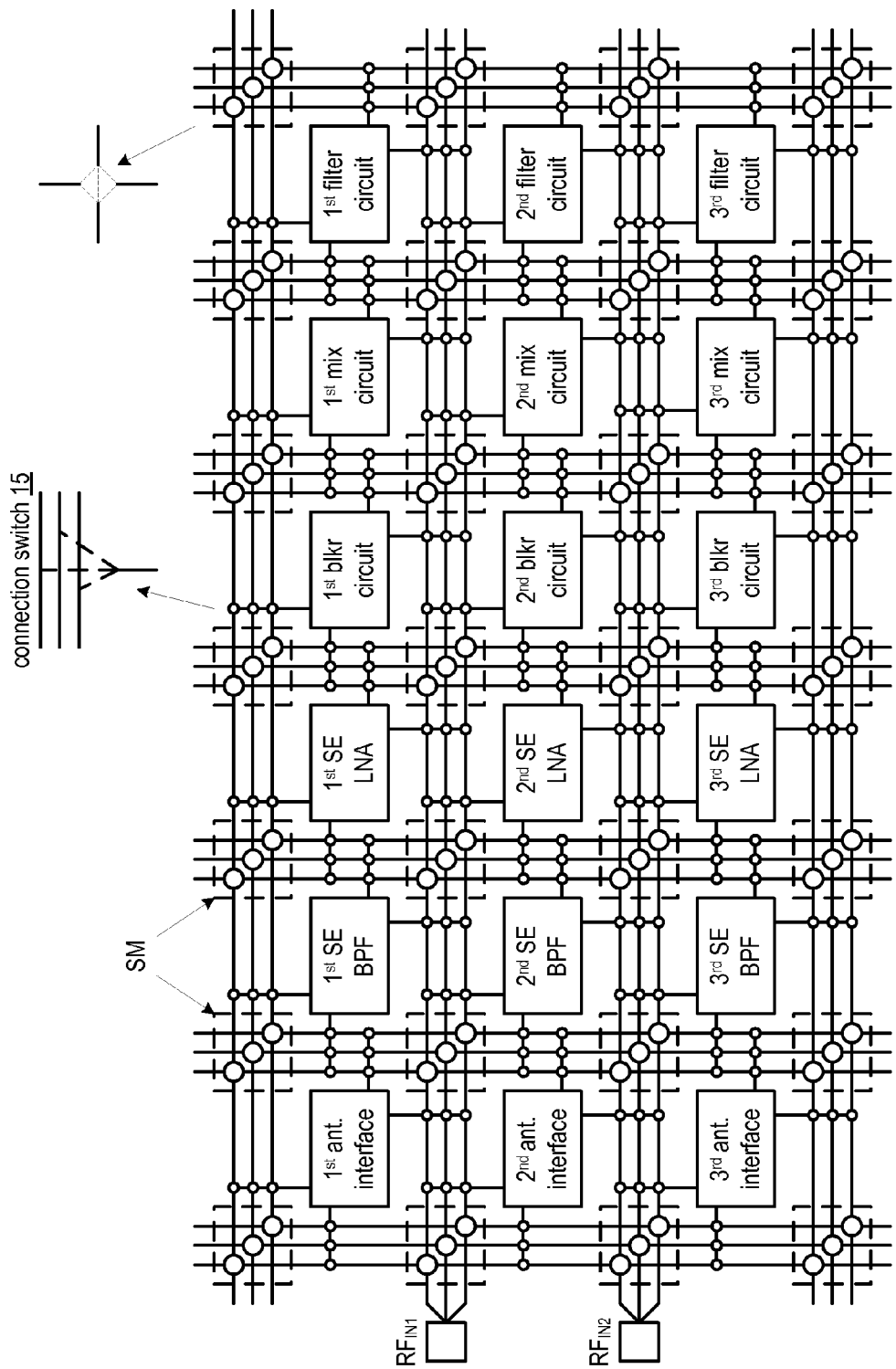
FIG. 2 is a schematic block diagram of an embodiment of a configurable RF receiver section of a transceiver IC in accordance with the present invention.

FIG. 2 is a schematic block diagram of an embodiment of a configurable RF receiver section of a transceiver IC 10. The configurable receiver section includes a plurality of switching modules (SM) a plurality of connection switches 15, a plurality of RFIO modules, a plurality of antenna interface circuits (ant. interface), a plurality of single-ended channel selection filters or RF bandpass filters (SE BPF), a plurality of single-ended and/or differential low noise amplifiers (LNA), a plurality of single-ended and/or differential blocking circuits (blkr circuit), a plurality of mixing circuits (mix circuit), and a plurality of baseband or near baseband filter circuits (filter circuit). The configuration receiver section further includes a plurality of vertical lines and a plurality of horizontal lines that intersection with the plurality of switch modules and with the connection switches 15.

In general, a switching module (SM) includes a first plurality of connection lines, a second plurality of plurality of connection lines, a third plurality of connection lines, a fourth plurality of connection lines; and a plurality of switching units. A first switching unit of the plurality of switching units is operable to couple a first connection line of the first plurality of connections lines to one of a first connection line of the second plurality of connection lines, a first connection line of the third plurality of connection lines, or a first connection line of the fourth plurality of connection lines. A second switching unit is operable to couple a second connection line of the first plurality of connections lines to one of a second connection line of the second plurality of connection lines, a second connection line of the third plurality of connection lines, or a second connection line of the fourth plurality of connection lines. If the switching module includes additional switching units, they provide similar connection options as the first and second switching units.

In the present diagram, each of the first, second, third, and fourth plurality of connections lines includes three lines, where the first and third connection lines intersect with three horizontal lines and the second and fourth connection lines intersect with three vertical lines. In this illustrate, the switching module includes three switching units, as represented by the circles, which provide six connection options for each pair of intersecting horizontal and vertical lines. As is further shown in this diagram, each connection switch 15 is coupled to one of an input, an output, a control line, etc. of a component (e.g., antenna interface circuit, BPF, LNA, etc.) and provides connection options thereto (e.g., a connection to one of the lines).

Each of the RFIO modules includes coupling to a switch module and may further include input circuitry and/or output circuitry. Input circuitry may include buffers, level shift, signal protocol conversion, etc. Output circuitry may include drivers, level shifters, signal protocol conversion, etc. In general, an RFIO module receives an inbound RF signal from one or more antennas and provides it to one or more configured receivers. The RFIO module may also provide an outbound RF signal from a configured transmitter to one or more antennas, which may be separate antennas from those used to receive an inbound RF signal, or shared antennas with the configured receiver section.

With each component coupled to multiple switching modules (SM) via multiple connection switches 15, the configurable receiver may be programmed in a variety of ways as will be discussed via the examples of FIG. 3-11.

FIG. 3 is a diagram of an example of multiple frequency bands that support multiple standards. The configurable RF transceiver IC 10 may be programmed to implement one or more transceivers, or a portion thereof, that is compliant with one or more of the standards in one or more of the frequency bands. In this example, three frequency bands are shown (but more or less frequency bands may be supported), where the frequency bands may be 900 MHz, 1800 MHz, 1900 MHz, 2100 MHz, 2.4 GHz, 5 GHz, 29 GHz, 60 GHz, etc. The standards may be one or more of IEEE 802.11, Bluetooth, ZigBee, CDMA, WCDMA, GSM, EDGE, GPRS, high-speed downlink packet access (HSDPA), high-speed uplink packet access (HSUPA), variations thereof, future versions thereof, and/or new standards.

Each frequency band may be divided into a plurality of channels, where the number of channels may vary from standard to standard. Each channel has a unique center frequency (e.g., F1, F2, F3) and its utilization may vary from standard to standard.

FIG. 4 is a schematic block diagram of an example of the configurable RF transceiver IC 10 being at least partially configured to produce a configured RF receiver section, which includes an antenna interface circuit, an RF bandpass filter (or channel select filter), a low noise amplifier module, a mix circuit, and a baseband or near baseband bandpass and/or low pass filter. The low noise amplifier module includes one or more low noise amplifiers and one or more ninety degree phase shift modules. The mix circuit includes a pair of mixers, a local oscillator (LO) and a summation module. Note that the 90° phase shift may be within the LO to provide I and Q local oscillations.

In operation, the antenna interface circuit, which may include an impedance matching circuit and/or a transmission line, receives one or more inbound RF signals from one or more antennas. The antenna interface provides the inbound RF signal(s) to the RF bandpass filter, which passes, substantially unattenuated, a desired signal component (e.g., one or more channels) and attenuates undesired signal components (e.g., signals outside of the one or more channels). The one or more channels are within one of the frequency bands (e.g., channel F1, channel F2, or channel F3).

The ninety degree phase shift module generates a quadrature (Q) component(s) of the inbound RF signal(s), such that the LNA amplifies an in-phase (I) component(s) and the Q component(s) of the inbound RF signal to produce an amplified I component(s) and an amplified Q component(s). A first mixer of the mix circuit mixes the amplified I component(s) with an I component(s) of a local oscillation(s) to produce a first mixed signal(s) and the second mixer mixes the amplified Q component(s) with a Q component(s) of a local oscillation (s) to produce a second mixed signal(s). The summing module combines the first and second mixed signals to produce a down converted signal(s). The baseband or near baseband filter filters the down converted signal(s) to produce an inbound symbol stream signal(s).

FIG. 5 is a schematic block diagram of a configuration example of the configured RF receiver section of FIG. 4. This portion of the configurable RF transceiver IC includes a plurality of antenna interface circuits, a plurality RF bandpass filters, a plurality of low noise amplifier modules, a plurality of blocker circuits, a plurality of mix circuits, and a plurality of baseband or near baseband filters. In this example, there are three components for each type of components (e.g., 3 LNA modules for the plurality of LNA modules). Each of the three components is operable in one of the three frequency bands of FIG. 3. For example, the first antenna interface module has an operational frequency range corresponding to the first frequency band of FIG. 3;

the second antenna interface module has an operational frequency range corresponding to the second frequency band of FIG. 3; and the third antenna interface module has an operational frequency range corresponding to the third frequency band of FIG. 3.

To implement the direct conversion receiver of FIG. 4 for receiving the inbound RF signal within the first frequency band centered at F1 (as shown in FIG. 3), the first antenna interface circuit, the first RF bandpass filter, the first LNA, the first mix module, and the second baseband or near baseband filter are selected. Note that each of the plurality of baseband or near baseband filters have different desired baseband or near baseband filtering characteristics (e.g., BPF, LPF, gain, corner frequenc(ies), etc.). As such, regardless of the frequency band of the inbound RF signal, any one of the baseband or near baseband filters may be used at this stage of the receiver section.

Note that another direct conversion receiver may be implemented using the second or third components to process inbound signals in the second or third frequency bands of FIG. 3. Further note that the direct conversion receiver as configured in FIG. 5 may be altered on a frame by frame basis, a communication by communication basis, or other desired interval and/or for a particular condition. For example, the configured direct conversion receiver may be reconfigured to include the first baseband or near baseband filter instead of the second one.

Figure 6:
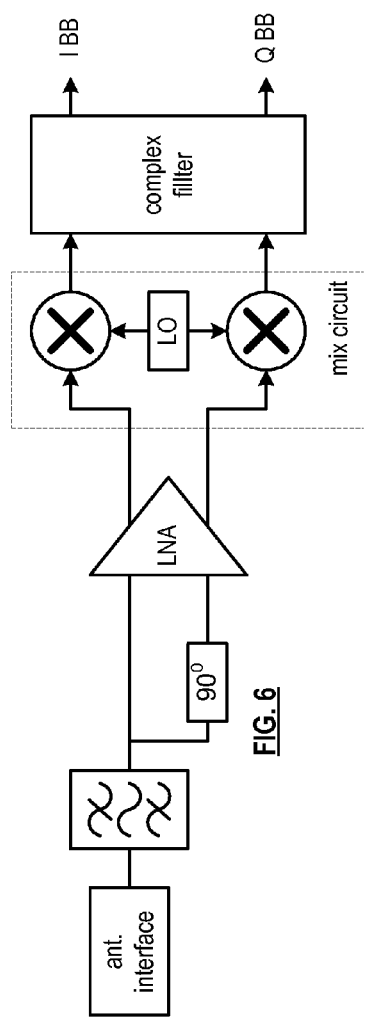
FIG. 6 is a schematic block diagram of an example of another configured RF receiver section in accordance with the present invention.

FIG. 6 is a schematic block diagram of an example of the configurable RF transceiver IC 10 being at least partially configured to produce a configured RF receiver section, which includes an antenna interface circuit, an RF bandpass filter (or channel select filter), a low noise amplifier module, a mix circuit, and a complex filter. The low noise amplifier module includes one or more low noise amplifiers and one or more ninety degree phase shift modules. The mix circuit includes a pair of mixers and a local oscillator (LO).

In operation, the antenna interface circuit, which may include an impedance matching circuit and/or a transmission line, receives one or more inbound RF signals from one or more antennas. The antenna interface provides the inbound RF signal(s) to the RF bandpass filter, which passes, substantially unattenuated, a desired signal component (e.g., one or more channels) and attenuates undesired signal components (e.g., signals outside of the one or more channels). The one or more channels are within one of the frequency bands (e.g., channel F1, channel F2, or channel F3).

The ninety degree phase shift module generates a quadrature (Q) component(s) of the inbound RF signal(s), such that the LNA amplifies an in-phase (I) component(s) and the Q component(s) of the inbound RF signal to produce an amplified I component(s) and an amplified Q component(s). A first mixer of the mix circuit mixes the amplified I component(s) with an I component(s) of a local oscillation(s) to produce a first mixed signal(s) and the second mixer mixes the amplified Q component(s) with a Q component(s) of a local oscillation (s) to produce a second mixed signal(s). The complex filter filters the first and second mixed signals to produce an I baseband component and Q baseband component.

Figure 7:
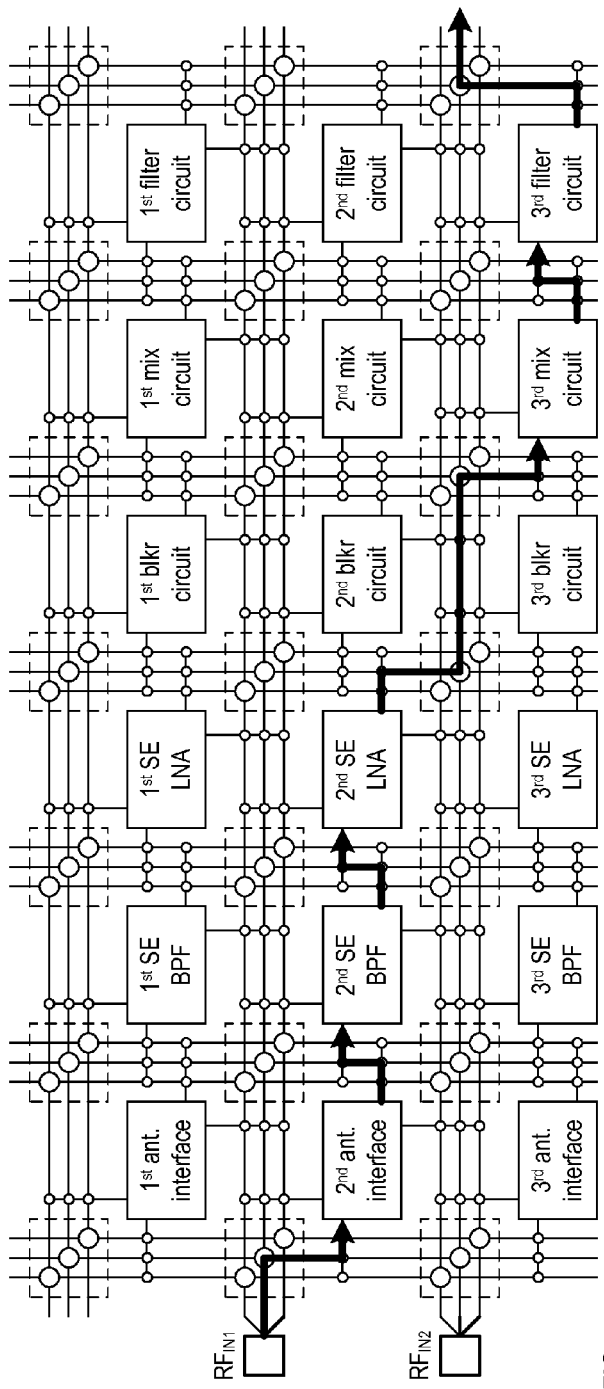
FIG. 7 is a schematic block diagram of a configuration example of the another configured RF receiver section in accordance with the present invention.

FIG. 7 is a schematic block diagram of a configuration example of the configured RF receiver section of FIG. 6. This portion of the configurable RF transceiver IC includes a plurality of antenna interface circuits, a plurality RF bandpass filters, a plurality of low noise amplifier modules, a plurality of blocker circuits, a plurality of mix circuits, and a plurality of complex filters. In this example, there are three components for each type of components (e.g., 3 LNA modules for the plurality of LNA modules). Each of the three components is operable in one of the three frequency bands of FIG. 3. For example, the first antenna interface module has an operational frequency range corresponding to the first frequency band of FIG. 3; the second antenna interface module has an operational frequency range corresponding to the second frequency band of FIG. 3; and the third antenna interface module has an operational frequency range corresponding to the third frequency band of FIG. 3.

To implement the direct conversion receiver of FIG. 6 for receiving the inbound RF signal within the second frequency band centered at F2 (as shown in FIG. 3), the second antenna interface circuit, the second RF bandpass filter, the second LNA, the third mix module, and the third complex filter are selected.

Note that another direct conversion receiver may be implemented using the first or third components to process inbound signals in the first or third frequency bands of FIG. 3. Further note that the direct conversion receiver as configured in FIG. 7 may be altered on a frame by frame basis, a communication by communication basis, or other desired interval and/or for a particular condition. For example, the configured direct conversion receiver may be reconfigured to include the first complex filter instead of the third one.

Figure 8:
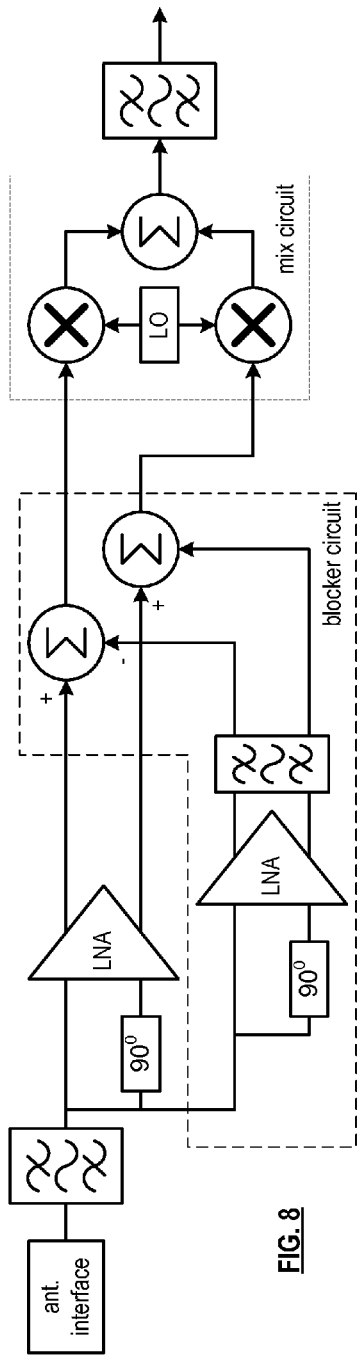
FIG. 8 is a schematic block diagram of an example of yet another configured RF receiver section in accordance with the present invention.

FIG. 8 is a schematic block diagram of an example of the configurable RF transceiver IC 10 being at least partially configured to produce a configured RF receiver section, which includes an antenna interface circuit, an RF bandpass filter (or channel select filter), a low noise amplifier module, a blocker circuit, a mix circuit, and a baseband or near baseband bandpass and/or low pass filter. The low noise amplifier module includes one or more low noise amplifiers and one or more ninety degree phase shift modules. The mix circuit includes a pair of mixers, a local oscillator (LO) and a summation module. The blocking circuit includes a ninety degree phase shift module, a low noise amplifier, a bandpass filter, and a pair of subtractors.

In operation, the antenna interface circuit, which may include an impedance matching circuit and/or a transmission line, receives one or more inbound RF signals from one or more antennas. The antenna interface provides the inbound RF signal(s) to the RF bandpass filter, which passes, substantially unattenuated, a desired signal component (e.g., one or more channels) and attenuates undesired signal components (e.g., signals outside of the one or more channels). The one or more channels are within one of the frequency bands (e.g., channel F1, channel F2, or channel F3). Alternatively, the RF bandpass filter may be omitted.

The ninety degree phase shift module of the LNA module generates a quadrature (Q) component(s) of the inbound RF signal(s), such that the LNA of the LNA module amplifies an in-phase (I) component(s) and the Q component(s) of the inbound RF signal to produce an amplified I component(s) and an amplified Q component(s). The ninety degree phase shift module of the blocking circuit generates a quadrature (Q) component(s) of the inbound RF signal(s), such that the LNA of the blocking circuit amplifies an in-phase (I) component(s) and the Q component(s) of the inbound RF signal to produce an amplified I component(s) and an amplified Q component(s). The bandpass filter filters the amplified I and Q components to substantially pass, unattenuated, a blocker component (e.g., a corresponding transmit signal of the transceiver) and to attenuate other signal components of the inbound RF signal to produce filtered I and Q components.

The subtractors subtract the filtered I and Q components from the amplified I and Q components to first an amplified and blocked I component(s) and an amplified and blocked Q component(s). A first mixer of the mix circuit mixes the amplified and blocked I component(s) with an I component(s) of a local oscillation(s) to produce a first mixed signal(s) and the second mixer mixes the amplified and blocked Q component(s) with a Q component(s) of a local oscillation(s) to produce a second mixed signal(s). The summing module combines the first and second mixed signals to produce a down converted signal(s). The baseband or near baseband filter filters the down converted signal(s) to produce an inbound symbol stream signal(s).

Figure 9:
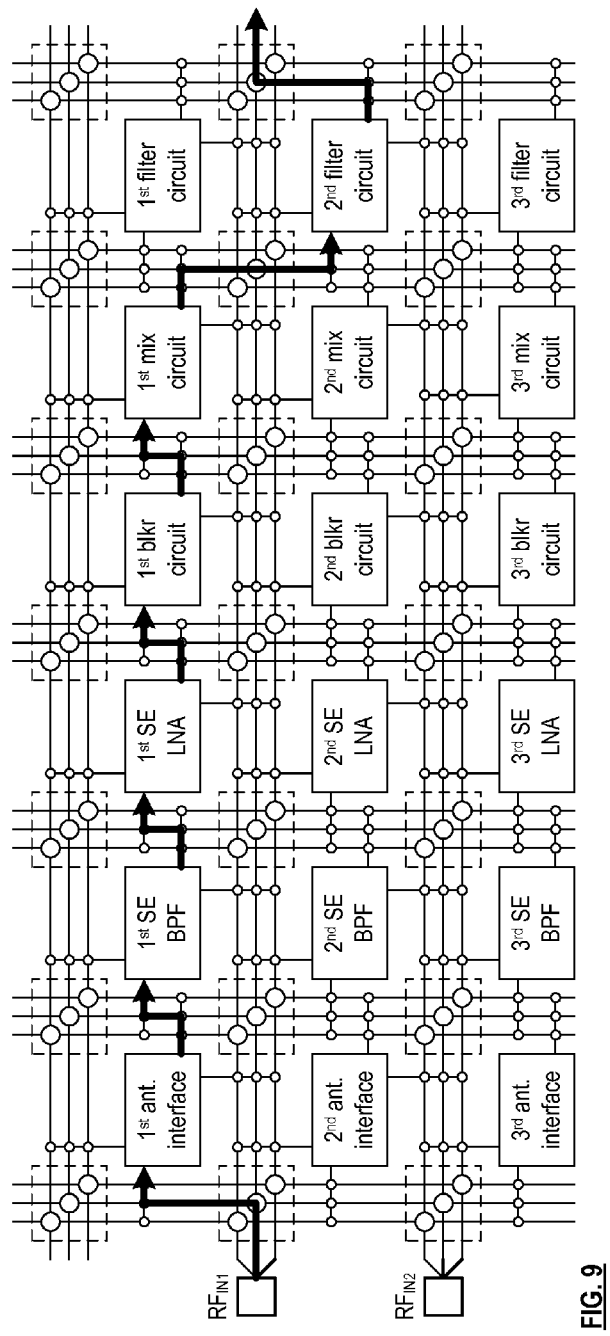
FIG. 9 is a schematic block diagram of a configuration example of the yet another configured RF receiver section in accordance with the present invention.

FIG. 9 is a schematic block diagram of a configuration example of the configured RF receiver section of FIG. 8. This portion of the configurable RF transceiver IC includes a plurality of antenna interface circuits, a plurality RF bandpass filters, a plurality of low noise amplifier modules, a plurality of blocker circuits, a plurality of mix circuits, and a plurality of baseband or near baseband filters. In this example, there are three components for each type of components (e.g., 3 LNA modules for the plurality of LNA modules). Each of the three components is operable in one of the three frequency bands of FIG. 3. For example, the first antenna interface module has an operational frequency range corresponding to the first frequency band of FIG. 3;

the second antenna interface module has an operational frequency range corresponding to the second frequency band of FIG. 3; and the third antenna interface module has an operational frequency range corresponding to the third frequency band of FIG. 3.

To implement the direct conversion receiver of FIG. 8 for receiving the inbound RF signal within the first frequency band centered at F1 (as shown in FIG. 3), the first antenna interface circuit, the first RF bandpass filter, the first LNA, the first blocking circuit, the first mix module, and the second baseband or near baseband filter are selected. Note that each of the plurality of baseband or near baseband filters have different desired baseband or near baseband filtering characteristics (e.g., BPF, LPF, gain, corner frequenc(ies), etc.). As such, regardless of the frequency band of the inbound RF signal, any one of the baseband or near baseband filters may be used at this stage of the receiver section.

Note that another direct conversion receiver may be implemented using the second or third components to process inbound signals in the second or third frequency bands of FIG. 3. Further note that the direct conversion receiver as configured in FIG. 9 may be altered on a frame by frame basis, a communication by communication basis, or other desired interval and/or for a particular condition. For example, the configured direct conversion receiver may be reconfigured to include the first baseband or near baseband filter instead of the second one.

Figure 10:
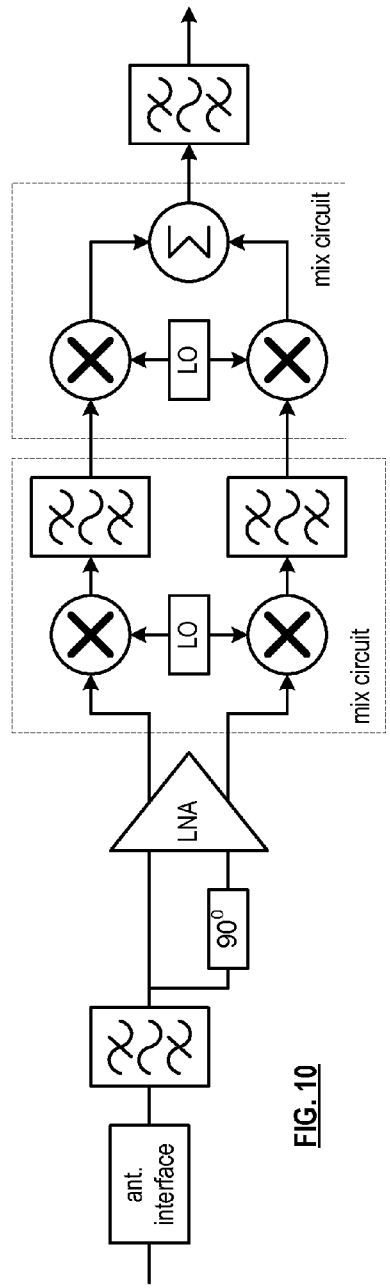
FIG. 10 is a schematic block diagram of an example of a further configured RF receiver section in accordance with the present invention.

FIG. 10 is a schematic block diagram of an example of the configurable RF transceiver IC 10 being at least partially configured to produce a configured RF receiver section, which includes an antenna interface circuit, an RF bandpass filter (or channel select filter), a low noise amplifier module, two mix circuits, and a baseband or near baseband bandpass and/or low pass filter. The low noise amplifier module includes one or more low noise amplifiers and one or more ninety degree phase shift modules. Each of the mix circuit includes a pair of mixers and a local oscillator (LO). The second mix circuit further includes a summation module.

In operation, the antenna interface circuit, which may include an impedance matching circuit and/or a transmission line, receives one or more inbound RF signals from one or more antennas. The antenna interface provides the inbound RF signal(s) to the RF bandpass filter, which passes, substantially unattenuated, a desired signal component (e.g., one or more channels) and attenuates undesired signal components (e.g., signals outside of the one or more channels). The one or more channels are within one of the frequency bands (e.g., channel F1, channel F2, or channel F3).

The ninety degree phase shift module generates a quadrature (Q) component(s) of the inbound RF signal(s), such that the LNA amplifies an in-phase (I) component(s) and the Q component(s) of the inbound RF signal to produce an amplified I component(s) and an amplified Q component(s). A first mixer of the first mix circuit mixes the amplified I component (s) with an I component(s) of a first local oscillation(s) to produce a first intermediate frequency (IF) mixed signal(s) and the second mixer of the first mix circuit mixes the amplified Q component(s) with a Q component(s) of the first local oscillation(s) to produce a second IF mixed signal(s). The filters filter the first and second IF mixed signals to produce an IF I component(s) and an IF Q component(s).

A first mixer of the second mix circuit mixes the IF I component(s) with an I component(s) of a second local oscillation(s) to produce a first mixed signal(s) and the second mixer of the second mix circuit mixes the IF Q component(s) with a Q component(s) of the second local oscillation(s) to produce a second mixed signal(s). The summing module combines the first and second mixed signals to produce a down converted signal(s). The baseband or near baseband filter filters the down converted signal(s) to produce an inbound symbol stream signal(s).

Figure 11:
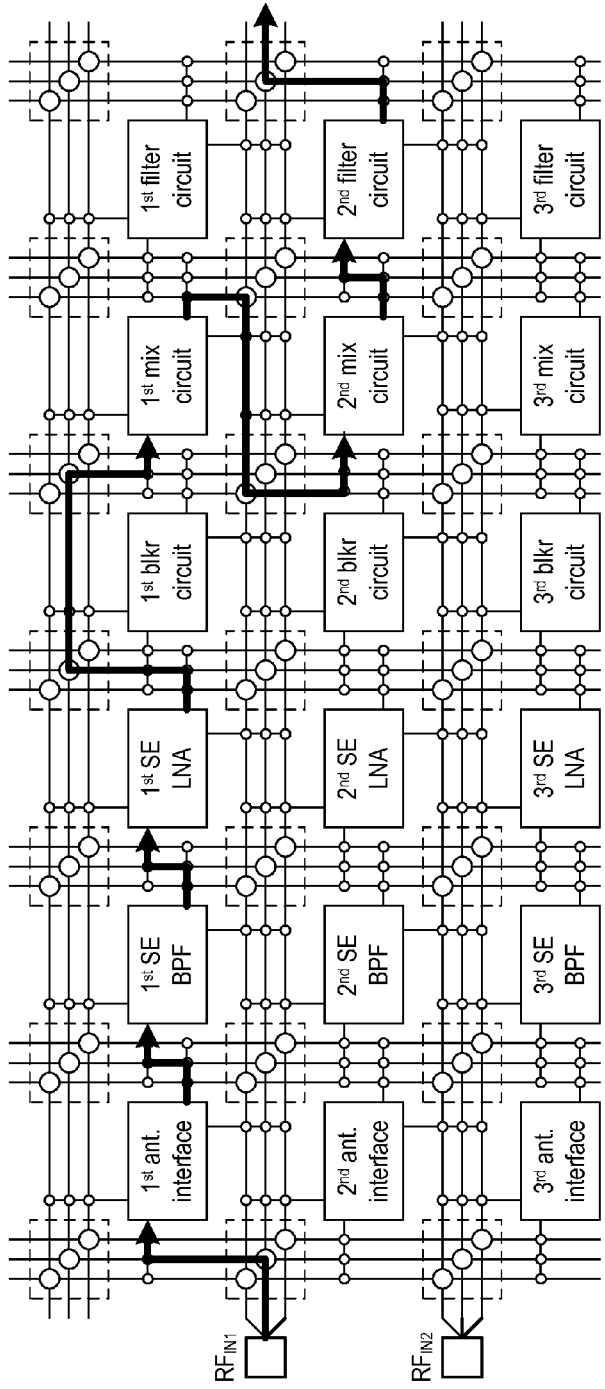
FIG. 11 is a schematic block diagram of a configuration example of the further configured RF receiver section in accordance with the present invention.

FIG. 11 is a schematic block diagram of a configuration example of the configured RF receiver section of FIG. 11. This portion of the configurable RF transceiver IC includes a plurality of antenna interface circuits, a plurality RF bandpass filters, a plurality of low noise amplifier modules, a plurality of blocker circuits, a plurality of mix circuits, and a plurality of baseband or near baseband filters. In this example, there are three components for each type of components (e.g., 3 LNA modules for the plurality of LNA modules). Each of the three components is operable in one of the three frequency bands of FIG. 3. For example, the first antenna interface module has an operational frequency range corresponding to the first frequency band of FIG. 3; the second antenna interface module has an operational frequency range corresponding to the second frequency band of FIG. 3; and the third antenna interface module has an operational frequency range corresponding to the third frequency band of FIG. 3.

To implement the superheterodyne receiver of FIG. 11 for receiving the inbound RF signal within the first frequency band centered at F1 (as shown in FIG. 3), the first antenna interface circuit, the first RF bandpass filter, the first LNA, the first mix circuit, the second mix circuit, and the second baseband or near baseband filter are selected. Note that each of the plurality of baseband or near baseband filters have different desired baseband or near baseband filtering characteristics (e.g., BPF, LPF, gain, corner frequenc(ies), etc.). As such, regardless of the frequency band of the inbound RF signal, any one of the baseband or near baseband filters may be used at this stage of the receiver section.

Note that another direct conversion receiver may be implemented using the second or third components to process inbound signals in the second or third frequency bands of FIG. 3. Further note that the direct conversion receiver as configured in FIG. 5 may be altered on a frame by frame basis, a communication by communication basis, or other desired interval and/or for a particular condition. For example, the configured direct conversion receiver may be reconfigured to include the first baseband or near baseband filter instead of the second one.

Figure 12:
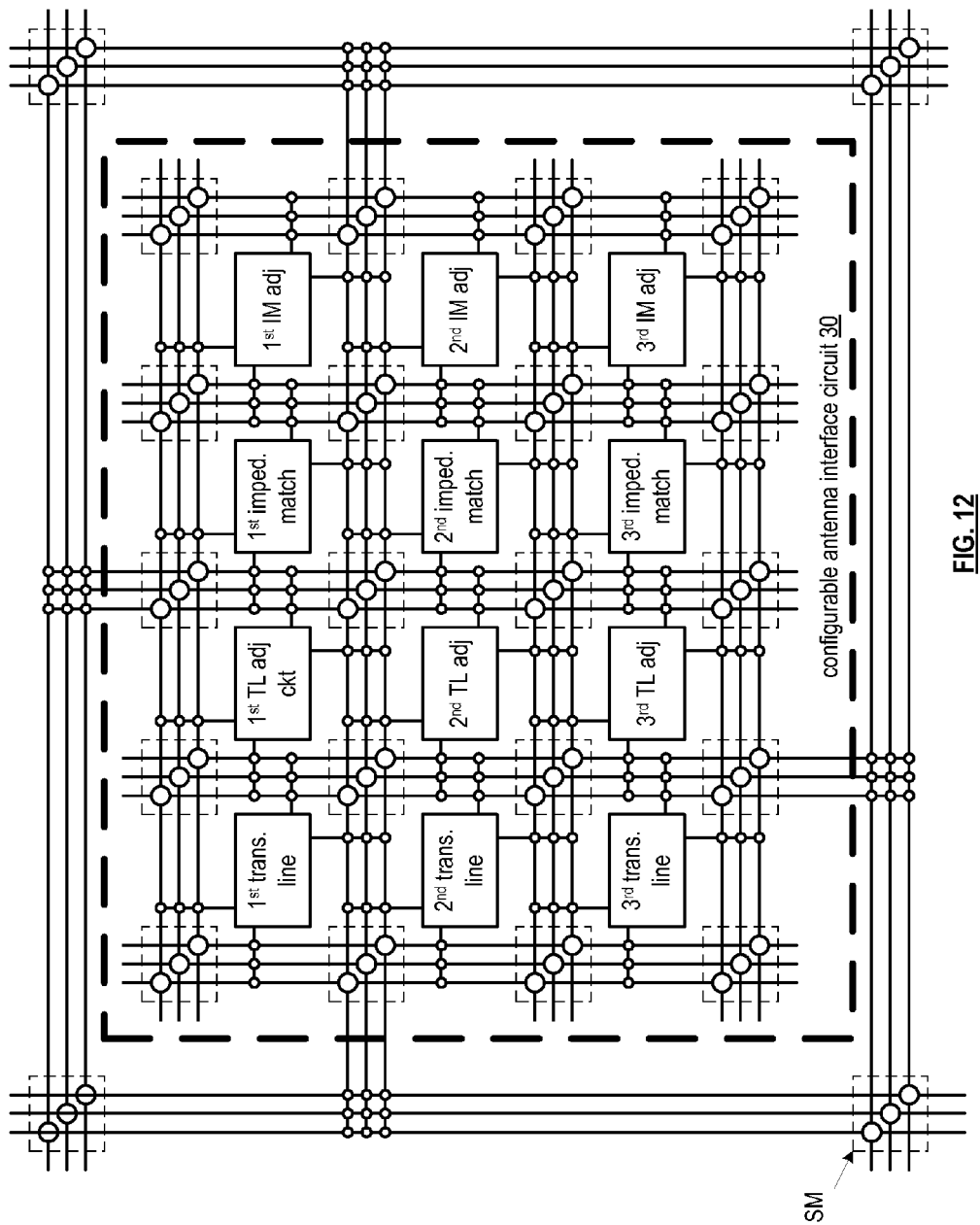
FIG. 12 is a schematic block diagram of an embodiment of a configurable match circuit in accordance with the present invention.

FIG. 12 is a schematic block diagram of an embodiment of an antenna interface circuit 30, which may be representative of one or more of the antenna interface circuits presented in the previous figures and/or in the subsequent figures. In this embodiment, the antenna interface circuit 30 includes a plurality of transmission lines, a plurality of transmission line adjustment circuit, a plurality of impedance matching circuits, and a plurality of impedance matching (IM) adjust circuits. Each of the transmission lines has a different operating frequency range (e.g., one is operable in each of the frequency bands of FIG. 3), which may be adjusted via one or more of the transmission line (TL) adjustment circuits. Each of the impedance matching circuits has a different operating frequency range (e.g., one is operable in each of the frequency bands of FIG. 3). The impedance of an impedance matching circuit may be adjusted by one or more of the impedance matching adjust circuits.

Figure 15:
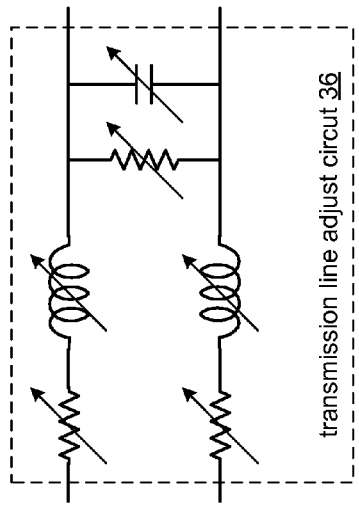
FIGS. 13-16 are schematic block diagrams of embodiments of configurable match circuit components in accordance with the present invention.
Figure 13:
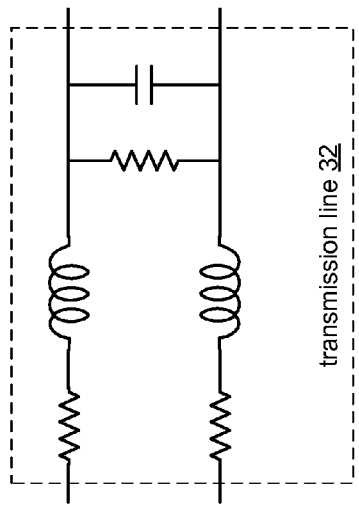
Figure 16:
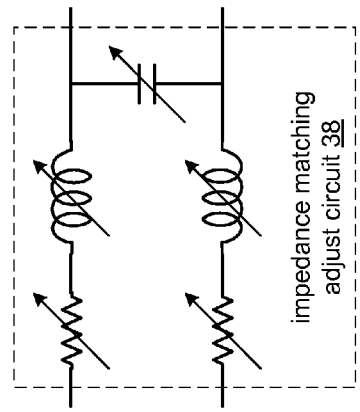
Figure 14:
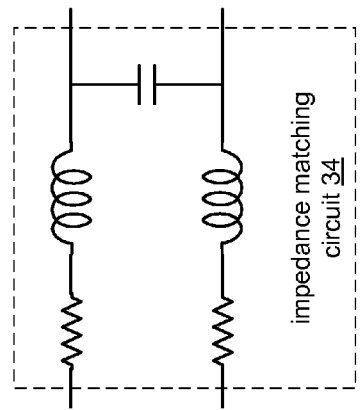

FIGS. 13-16 are schematic block diagrams of embodiments of configurable match circuit components of FIG. 12. FIG. 13 illustrates an example schematic of a transmission line 32 that is representative of each of the transmission line circuits of FIG. 12. FIG. 14 illustrates an example schematic of an impedance matching circuit 34 that is representative of each of the impedance matching circuits of FIG. 12. FIG. 15 illustrates a schematic of a transmission line adjustment circuit 36 that is representative of each of the transmission line adjustment circuits of FIG. 12. FIG. 16 illustrates a schematic of an impedance matching adjustment circuit 38 that is representative of each of the impedance matching adjustment circuits of FIG. 12.

Figure 17:
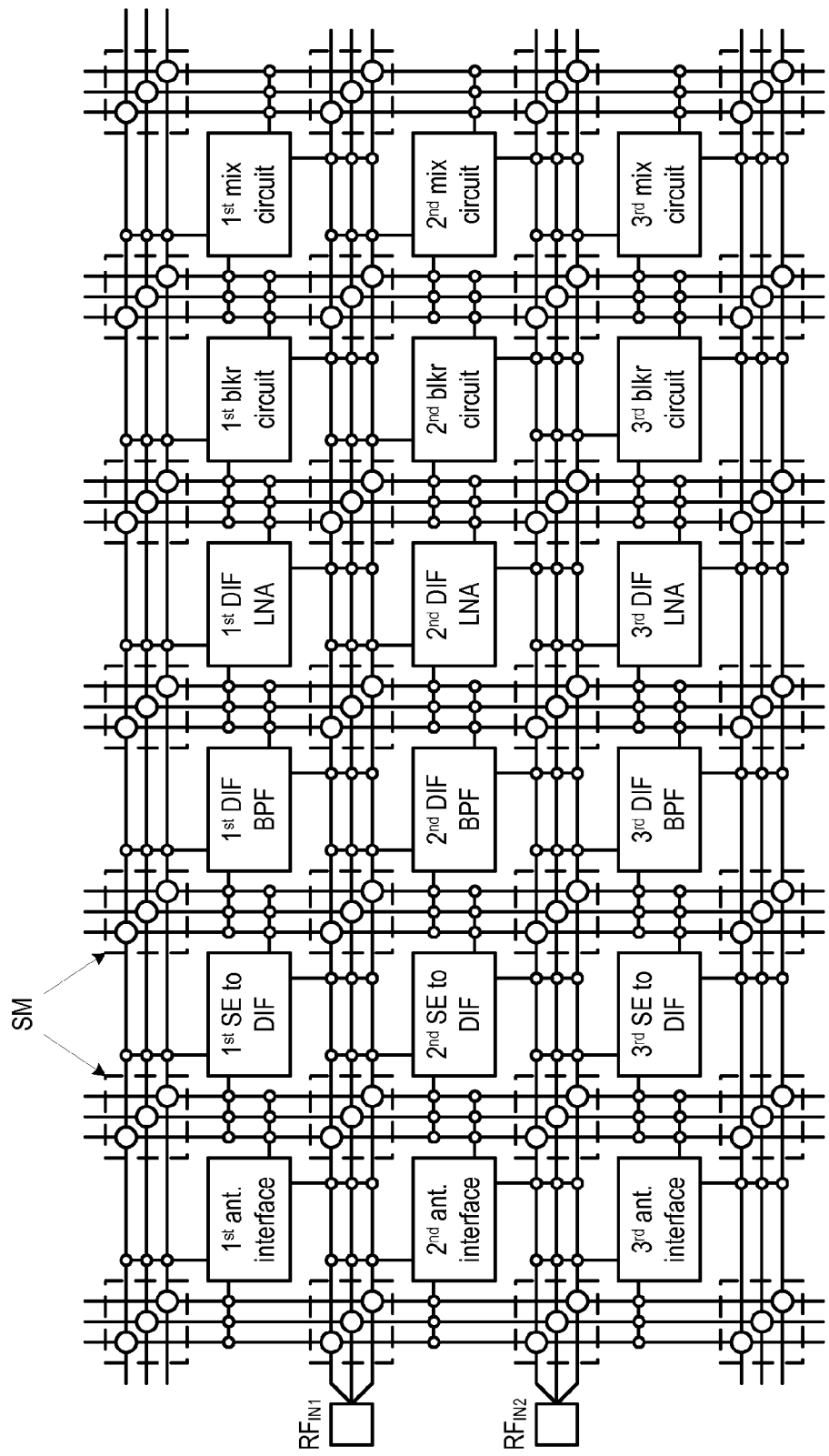
FIG. 17 is a schematic block diagram of another embodiment of a configurable RF receiver section of a transceiver IC in accordance with the present invention.

FIG. 17 is a schematic block diagram of another embodiment of a configurable RF receiver section of a transceiver IC 10. In this embodiment, the receiver section includes the plurality of antenna interface circuits, a plurality of single-ended to differential converters (e.g., transformer baluns), a plurality of differential RF bandpass filters (BPF), a plurality of differential LNAs, a plurality of blocking circuits, and a plurality of differential mixing circuits. This embodiment of the receiver section can be programmed to provide a variety of receiver embodiments as previously discussed with reference to FIGS. 3-11. Note that this embodiment of a configurable receiver section may be on the same IC as the embodiment of FIG. 2 to provide further receiver configuration options.

Figure 18:
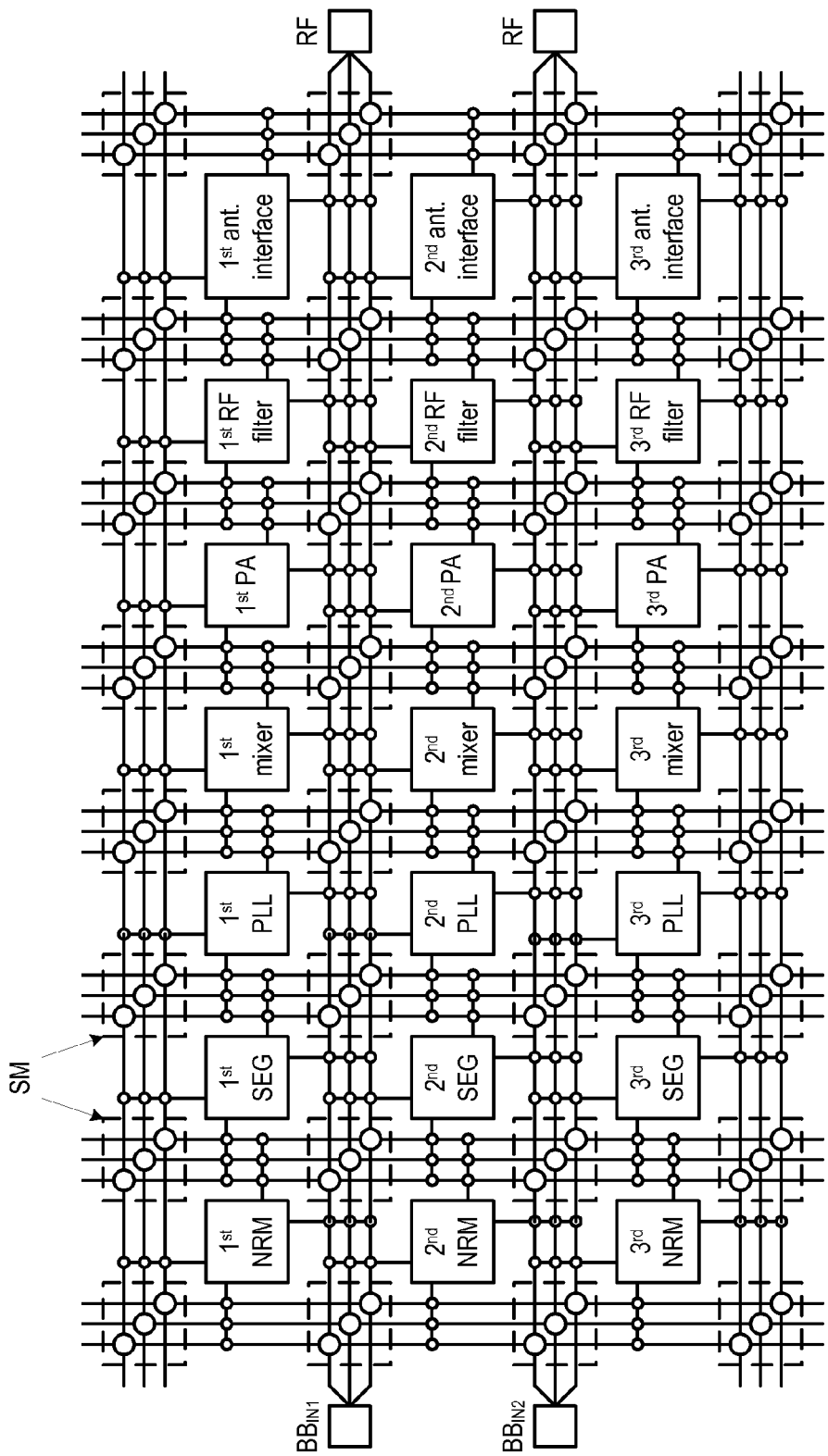
FIG. 18 is a schematic block diagram of an embodiment of a configurable RF transmitter section of a transceiver IC in accordance with the present invention.

FIG. 18 is a schematic block diagram of an embodiment of a configurable RF transmitter section of a transceiver IC 10. The configurable RF transmitter section includes a plurality of switch modules (SM), a plurality of normalizing modules (NRM), a plurality of segregation modules (SEG), a plurality of phase locked loops (PLL), a plurality of mixers, a plurality of power amplifiers (PA), a plurality of RF filters, and a plurality of antenna interface circuits. One or more of the components (e.g., NRM, SEG, PLL, mixer, PA, and/or RF filter) may be a single-ended circuit or a differential circuit. Note that the configurable RF transmitter section can be configured to provide one or more of a variety of different transmitters. A few examples of configurable transmitters are shown in FIGS. 19-25.

Figure 19:
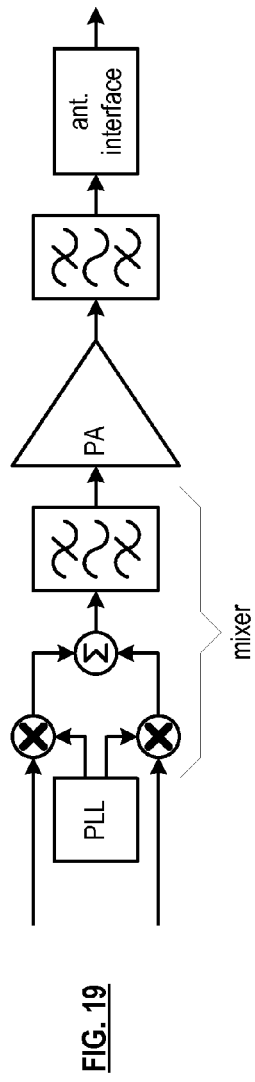
FIG. 19 is a schematic block diagram of an example of a configured RF transmitter section in accordance with the present invention.

FIG. 19 is a schematic block diagram of an example of a configured RF transmitter section that converts a baseband signal into an outbound RF signal. The configured transmitter includes a PLL, a mixer, a power amplifier, an RF filter, and a transmitter antenna interface circuit. The PLL (which includes a phase-frequency detector, a charge pump, a voltage controlled oscillation, a feedback divider and may further include one or more output dividers, one or more multipliers, and/or one or more adders) generates an I component and a Q component of a local oscillation.

A first mixer of the mixing circuit mixes the I component of the local oscillation with an I component of the outbound baseband signal to produce a first mixed signal and the second mixer of the mixing circuit mixes the Q component of the local oscillation with a Q component of the outbound baseband signal to produce a second mixed signal. The summing module of the mixer combines the first and second mixed signals to a combined mixed signal. The filter of the mixing circuit filters the combined mixed signal to produce an up-converted signal.

The power amplifier amplifies the up-converted signal to produce an amplified up-converted signal. The RF baseband filter filters the up-converted signal to produce the outbound RF signal. The antenna interface module provides the outbound RF signal to one or more antennas for transmission.

Figure 20:
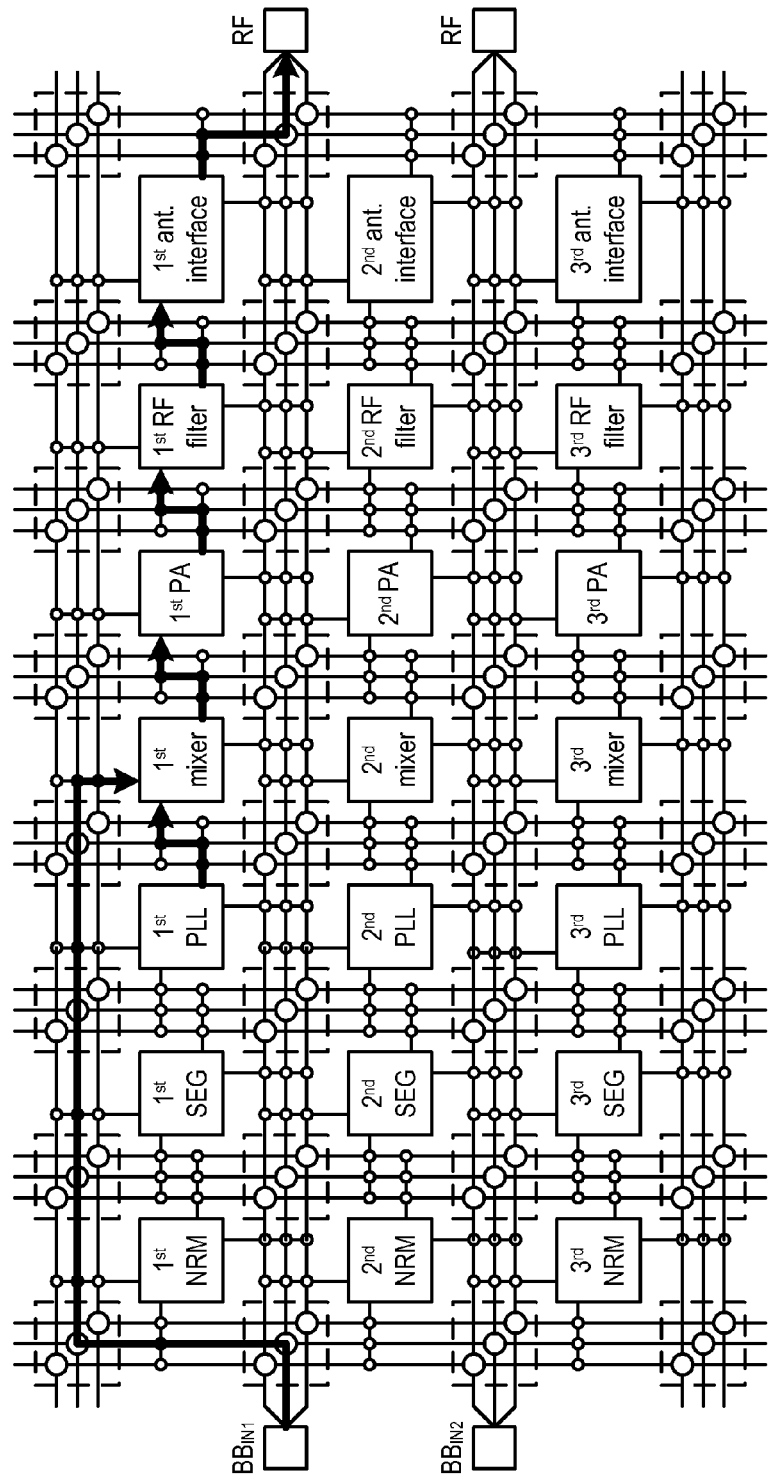
FIG. 20 is a schematic block diagram of a configuration example of the configured RF transmitter section in accordance with the present invention.

FIG. 20 is a schematic block diagram of a configuration example of the configured RF transmitter section of FIG. 19. This portion of the configurable RF transceiver IC includes a plurality of antenna interface circuits, a plurality RF bandpass filters, a plurality of power amplifiers, a plurality of mixing circuits, a plurality of PLLs, a plurality of segregation modules, and a plurality of normalizing modules. In this example, there are three components for each type of components (e.g., 3 PAs for the plurality of PA). Each of the three components is operable in one of the three frequency bands of FIG. 3. For example, the first antenna interface module has an operational frequency range corresponding to the first frequency band of FIG. 3; the second antenna interface module has an operational frequency range corresponding to the second frequency band of FIG. 3; and the third antenna interface module has an operational frequency range corresponding to the third frequency band of FIG. 3.

To implement the direct conversion transmitter of FIG. 19 for transmitting an outbound RF signal within the first frequency band centered at F1 (as shown in FIG. 3), the first antenna interface circuit, the first RF bandpass filter, the first PA, the first mix circuit, and the first PLL are selected and interconnected via the switch modules and connection switches. Note that another direct conversion transmitter may be implemented using the second or third components to produce outbound signals in the second or third frequency bands of FIG. 3. Further note that the direct conversion transmitter as configured in FIG. 20 may be altered on a frame by frame basis, a communication by communication basis, other desired interval, and/or for a particular condition.

Figure 21:
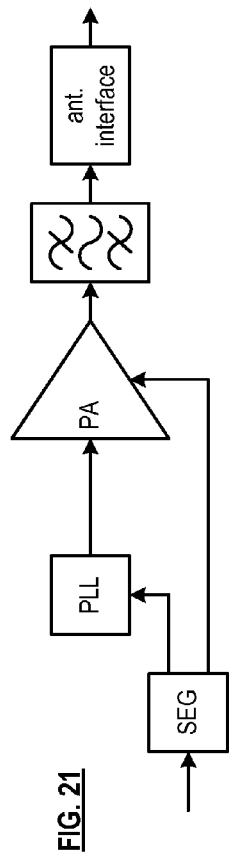
FIG. 21 is a schematic block diagram of an example of another configured RF transmitter section in accordance with the present invention.

FIG. 21 is a schematic block diagram of an example of another configured RF transmitter section that converts a baseband signal into an outbound RF signal. The configured transmitter includes a segregation module (SEG), a PLL, a power amplifier, an RF filter, and a transmitter antenna interface circuit. The segregation module receives the outbound baseband signal and processes it to produce phase modulation information, frequency modulation information, and/or amplitude modulation information. The segregation module provides the phase or frequency modulation information to the PLL and provides the amplitude modulation information, if any, to the power amplifier.

The PLL (which includes a phase-frequency detector, a charge pump, a voltage controlled oscillation, a feedback divider and may further include one or more output dividers, one or more multipliers, and/or one or more adders) generates a phase or frequency modulated oscillation based on the phase or frequency modulation information. The power amplifier amplifies the phase of frequency modulated oscillation based on the amplitude modulation information to produce an amplified phase or frequency modulated oscillation. The RF baseband filter filters the amplified phase or frequency modulated oscillation to produce the outbound RF signal. The antenna interface module provides the outbound RF signal to one or more antennas for transmission.

Figure 22:
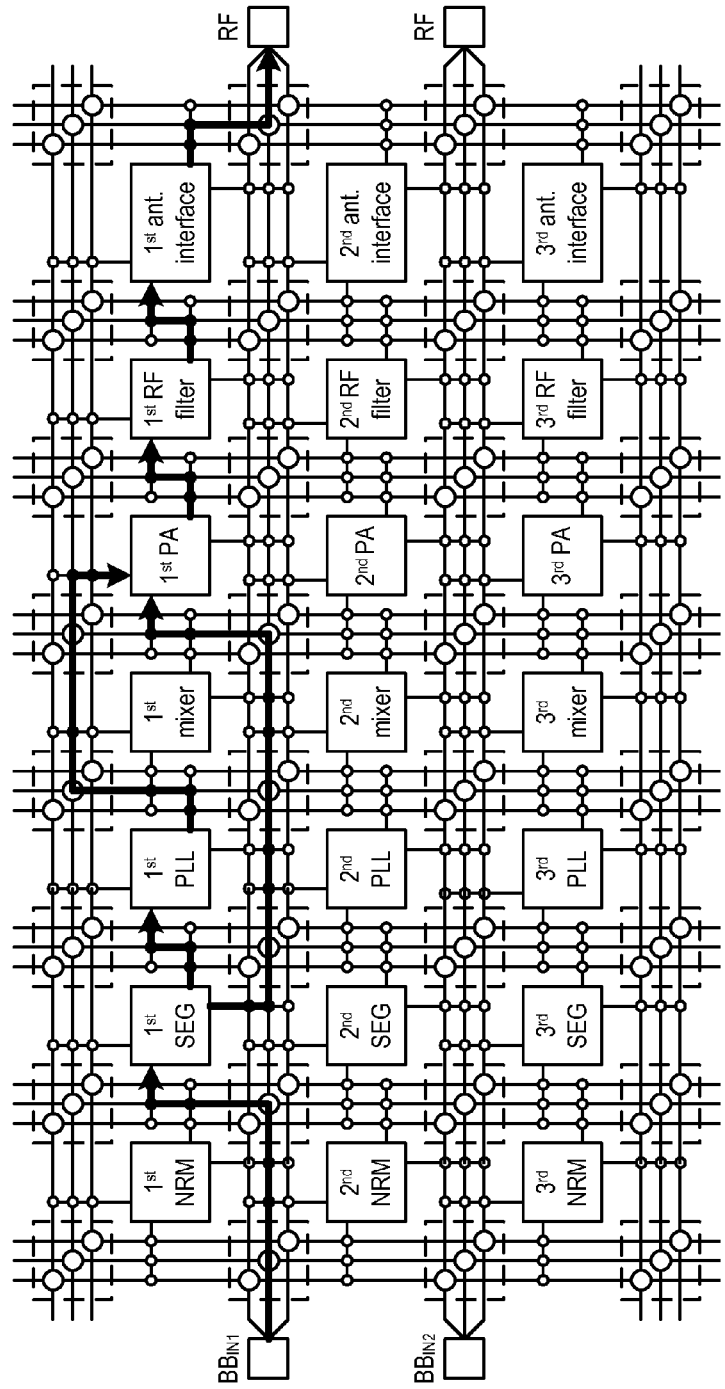
FIG. 22 is a schematic block diagram of a configuration example of the another configured RF transmitter section in accordance with the present invention.

FIG. 22 is a schematic block diagram of a configuration example of the configured RF transmitter section of FIG. 21. This portion of the configurable RF transceiver IC includes a plurality of antenna interface circuits, a plurality RF bandpass filters, a plurality of power amplifiers, a plurality of mixing circuits, a plurality of PLLs, a plurality of segregation modules, and a plurality of normalizing modules. In this example, there are three components for each type of components (e.g., 3 PAs for the plurality of PA). Each of the three components is operable in one of the three frequency bands of FIG. 3. For example, the first antenna interface module has an operational frequency range corresponding to the first frequency band of FIG. 3; the second antenna interface module has an operational frequency range corresponding to the second frequency band of FIG. 3; and the third antenna interface module has an operational frequency range corresponding to the third frequency band of FIG. 3.

To implement the direct conversion transmitter of FIG. 21 for transmitting an outbound RF signal within the first frequency band centered at F1 (as shown in FIG. 3), the first antenna interface circuit, the first RF bandpass filter, the first PA, the first segregation module, and the first PLL are selected and interconnected via the switch modules and connection switches. Note that another direct conversion transmitter may be implemented using the second or third components to produce outbound signals in the second or third frequency bands of FIG. 3. Further note that the direct conversion transmitter as configured in FIG. 22 may be altered on a frame by frame basis, a communication by communication basis, other desired interval, and/or for a particular condition.

Figure 23:
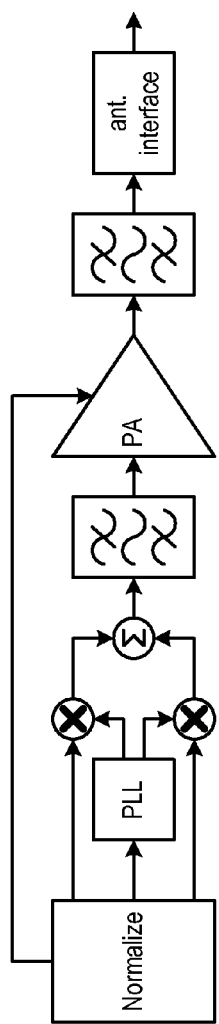
FIG. 23 is a schematic block diagram of an example of yet another configured RF transmitter section in accordance with the present invention.

FIG. 23 is a schematic block diagram of an example a configured RF transmitter section that converts a baseband signal into an outbound RF signal. The configured transmitter includes a normalizing module (NRM), a PLL, a mixer, a power amplifier, an RF filter, and a transmitter antenna interface circuit. The normalizing module converts an I component and a Q component of an outbound baseband signal into a normalized I component, a normalized Q component, phase or frequency modulation information, and, if included, amplitude modulation information. The normalizing module produces the normalized components by limiting the I and Q components to a fixed and nominal amplitude. To produce the phase modulation information, the normalizing module calculates a phase relationship between the magnitude of the I component and the magnitude of the Q component. The normalizing module generates the amplitude modulation information based on an amplitude relationship between the magnitude of the I and Q components.

The PLL (which includes a phase-frequency detector, a charge pump, a voltage controlled oscillation, a feedback divider and may further include one or more output dividers, one or more multipliers, and/or one or more adders) generates a phase or frequency modulated local oscillation based on the phase or frequency modulation information. A first mixer of the mixing circuit mixes an I component of the phase or frequency modulated local oscillation with the normalized I component to produce a first mixed signal and the second mixer of the mixing circuit mixes a Q component of the phase or frequency modulated local oscillation with the normalized Q component to produce a second mixed signal. The summing module of the mixer combines the first and second mixed signals to a combined mixed signal. The filter of the mixing circuit filters the combined mixed signal to produce an up-converted signal.

The power amplifier amplifies the up-converted signal based on the amplitude modulation information to produce an amplified and amplitude modulated signal. The RF baseband filter filters the amplified and amplitude modulated signal to produce the outbound RF signal. The antenna interface module provides the outbound RF signal to one or more antennas for transmission.

Figure 24:
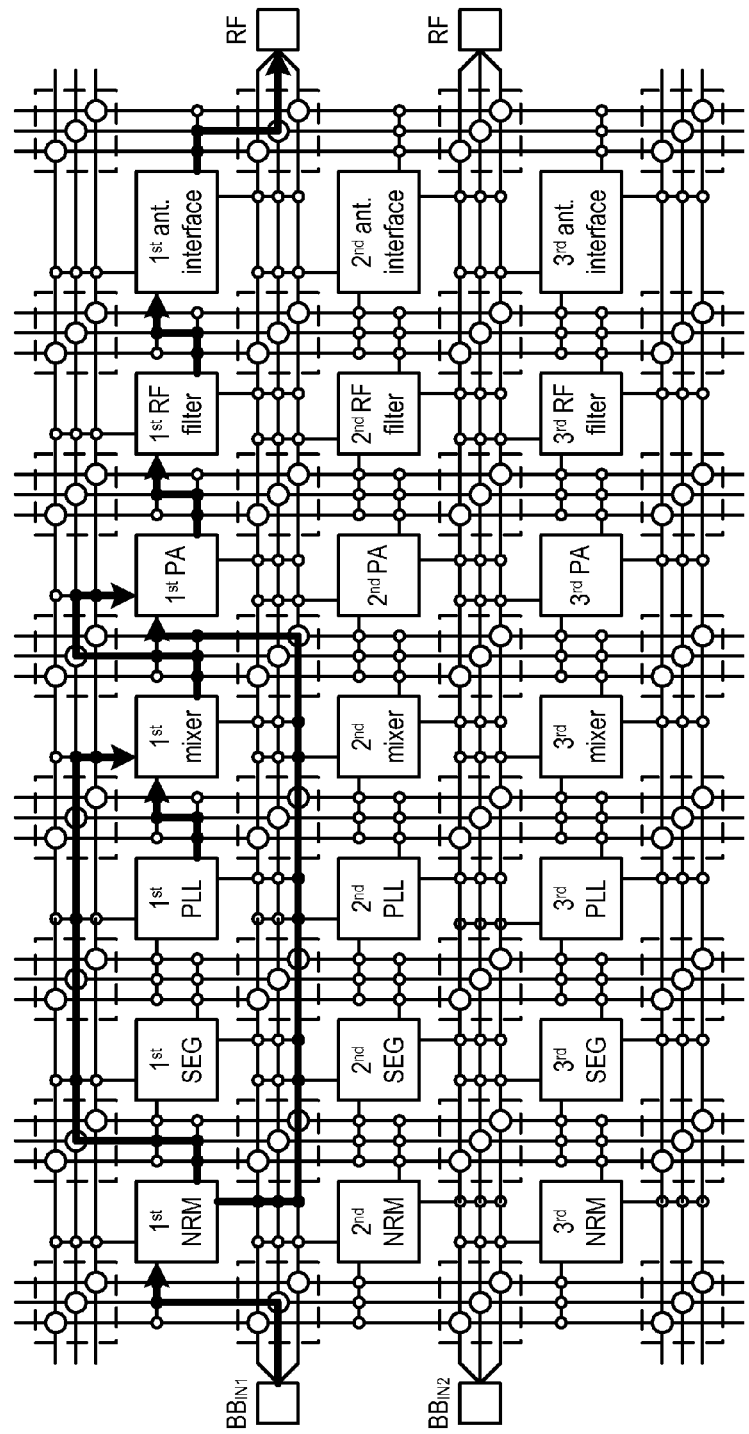
FIG. 24 is a schematic block diagram of a configuration example of the yet another configured RF transmitter section in accordance with the present invention.

FIG. 24 is a schematic block diagram of a configuration example of the configured RF transmitter section of FIG. 23. This portion of the configurable RF transceiver IC includes a plurality of antenna interface circuits, a plurality RF bandpass filters, a plurality of power amplifiers, a plurality of mixing circuits, a plurality of PLLs, a plurality of segregation modules, and a plurality of normalizing modules. In this example, there are three components for each type of components (e.g., 3 PAs for the plurality of PA). Each of the three components is operable in one of the three frequency bands of FIG. 3. For example, the first antenna interface module has an operational frequency range corresponding to the first frequency band of FIG. 3; the second antenna interface module has an operational frequency range corresponding to the second frequency band of FIG. 3; and the third antenna interface module has an operational frequency range corresponding to the third frequency band of FIG. 3.

To implement the direct conversion transmitter of FIG. 23 for transmitting an outbound RF signal within the first frequency band centered at F1 (as shown in FIG. 3), the first antenna interface circuit, the first RF bandpass filter, the first PA, the first normalizing module, the first mixing circuit, and the first PLL are selected and interconnected via the switch modules and connection switches. Note that another direct conversion transmitter may be implemented using the second or third components to produce outbound signals in the second or third frequency bands of FIG. 3. Further note that the direct conversion transmitter as configured in FIG. 24 may be altered on a frame by frame basis, a communication by communication basis, other desired interval, and/or for a particular condition.

Figure 25:
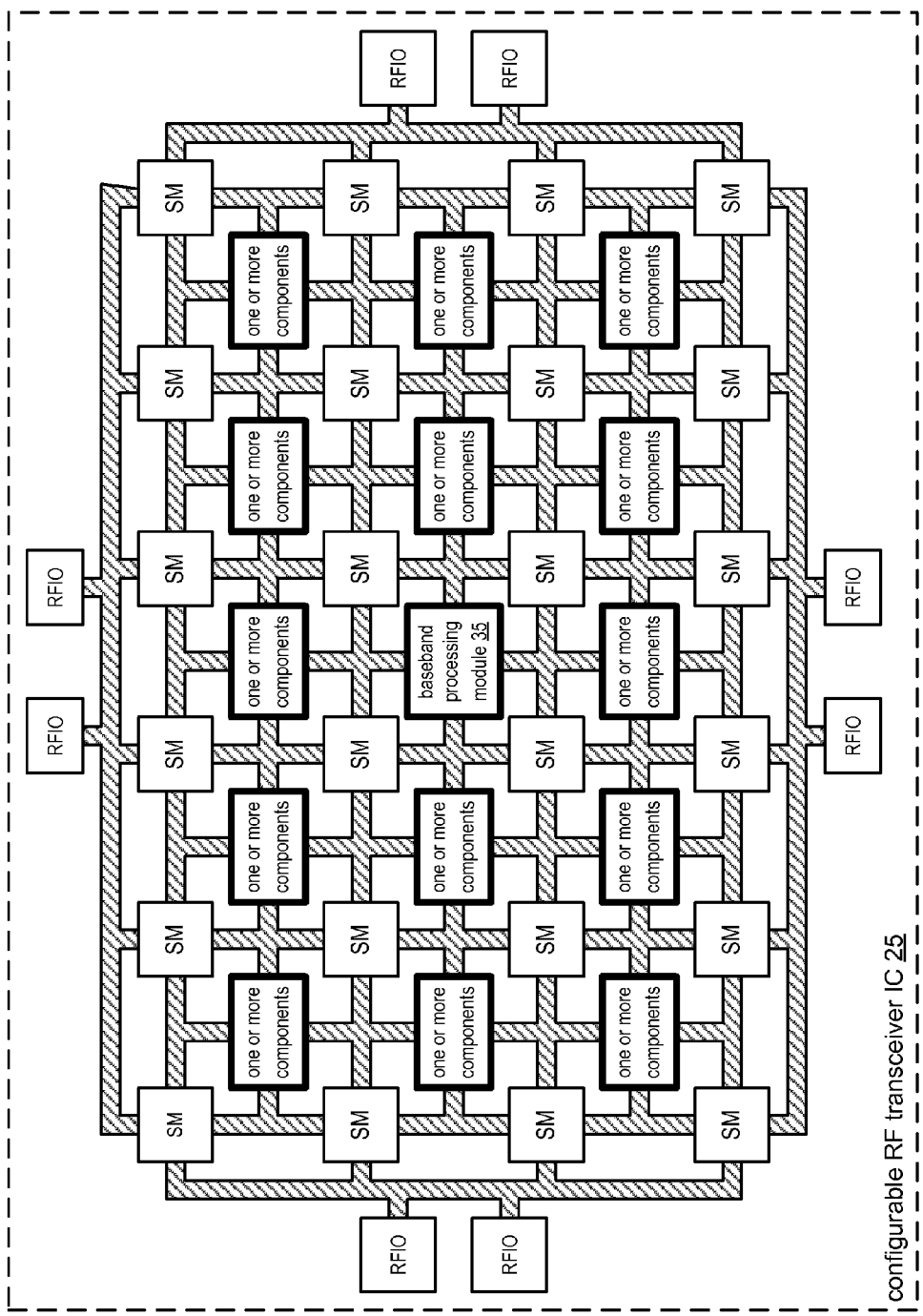
FIG. 25 is a schematic block diagram of another embodiment of a configurable RF transceiver IC in accordance with the present invention.

FIG. 25 is a schematic block diagram of another embodiment of a configurable RF transceiver IC 25 that includes a plurality of switching modules (SM), a plurality of components, a baseband processing module 35, and at least one RF input/output module (RFIO). The configurable RF transceiver IC 25 may be configured to provide one or more receivers and/or one or more transmitters that are compliant with one or more of a plurality of wireless communication standards. The wireless communication standards include, but are not limited to, IEEE 802.11, Bluetooth, ZigBee, CDMA, WCDMA, GSM, EDGE, GPRS, high-speed downlink packet access (HSDPA), high-speed uplink packet access (HSUPA), variations thereof, and/or future versions thereof. In addition, the configurable RF transceiver IC 10 may be configured for non-standardized or future standard communications such as 60 GHz wireless communications.

The plurality of components includes a plurality of receiver components, a plurality of transmitter components, and/or a plurality of common components. The plurality of receiver components may include one or more low noise amplifiers, one or more receiver antenna interface circuits, one or more channel selection or RF bandpass filters (single-ended and/or differential), one or more blocking circuits, one or more mixing circuits, one or more intermediate frequency (IF) filters, one or more analog to digital converters, one or more low IF or baseband filters, and/or one or more receiver single-ended to differential converters (e.g., a transformer balun). The plurality of transmitter components may include one or more transmitter antenna interface circuits, one or more channel selection or RF bandpass filters, one or more power amplifiers and/or power amplifier drivers, one or more mixers, one or more phase locked loops, one or more segregation modules, one or more normalizing modules, one or more IF filters, one or more digital to analog converters, and/or one or more low IF or baseband filters. The plurality of common components may include one or more antenna interface circuits, one or more transmit receive switches, one or more transformer baluns, one or more digital logic blocks, one or more RF bandpass filters, and/or one or more duplexers.

In addition, the plurality of components may include a plurality of fixed circuits, a plurality of adjustable circuits, and/or a plurality of circuit elements. For example, an RF bandpass filter may be a fixed circuit (i.e., have a fixed gain, fixed roll-off, and fixed corner frequencies) or an adjustable circuit (i.e., have an adjustable gain, an adjustable roll-off, and/or an adjustable corner frequencies). As another example, a circuit element may be a resistor, capacitor, inductor, transistor, etc. that may be combined with other circuit elements to form a circuit (e.g., a filter) or used in combination with a fixed or adjustable circuit to change the properties (e.g., gain, bandwidth, frequency, etc.) of the circuit, to buffer an input or output of a circuit, etc.

In operation, the configurable RF transceiver IC 25 receives a configuration instruction from the baseband processing module 35. The configuration instruction provides coupling information such that the RF IO module (RFIO) and selected components of the plurality of components are interconnected via the at least some of the plurality of switching modules to produce at least a portion of a receiver and/or at least a portion of transmitter. As an example, the configuration instruction may be comparable to a configuration instruction used to program a field programmable gate array (FPGA), complex programmable logic device (CPLD), and/or other programmable logic device or gate array.

In addition, the configurable RF transceiver IC 25 may receive a second configuration instruction from the baseband processing module 35. The second configuration instruction provides coupling information such that a second RF IO module (RFIO) and second selected components of the plurality of components are inter-connected via the at least a second some of the plurality of switching modules to produce at least a portion of a second receiver and/or at least a portion of second transmitter. In this instance, the configurable RF transceiver IC 25 is provided two or more transceivers, where each of the transceivers supports a wireless communication standard in one or more frequency bands. For example, one transceiver may be used to support a Bluetooth communication in the 2.4 GHz frequency band and a second transceiver may be used to support a GSM communication in the 1800 or 1900 MHz frequency band.

The configurable RF transceiver IC 25 may also be configured to provide at least a portion of a MIMO (Multiple Input Multiple Output) transceiver. For instance, the baseband processing module 35 may generate a MIMO configuration information that provides coupling information such that the RF IO module, the second RF IO module, and MIMO selected components of the plurality of components are interconnected via at least some of the plurality of switching modules to produce the at least a portion of a MIMO transceiver. Note that the IC 25 may be simultaneously configured to provide two or more MIMO transceivers, or portions thereof, provide a MIMO transceiver and at least one other transceiver, and/or provide any other combination of transceivers or portions thereof to support one or more standards in one or more frequency bands.

In addition to providing one or more radio transceivers as just discussed, the baseband processing module 35 provides baseband function of data. The baseband processing module 35 may be a single processing device, a plurality of processing devices, a plurality of baseband receiver components, and/or a plurality of baseband transmitter components. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-26.

The plurality of baseband receiver components may include one or more digital intermediate frequency to baseband conversion circuits, one or more time to frequency domain conversion circuits, one or more space-time-block decoding circuits, one or more space-frequency-block decoding circuits, one or more demodulation circuits, one or more frequency spread decoding circuits, one or more frequency hopping decoding circuits, one or more beamforming decoding circuits, one or more constellation demapping circuits, one or more deinterleaving circuits, one or more decoding circuits, one or more depuncturing circuits, and/or one or more descrambling circuits. The plurality of baseband receiver components may be configured into one or receiver paths that support the same or different wireless communication protocols (e.g., GSM, CDMA, WCDMA, HSUPA, HSDPA, WiMAX, EDGE, GPRS, universal mobile telecommunications system (UMTS), long term evolution (LTE), IEEE 802.16, evolution data optimized (EV-DO), IEEE 802.11, Bluetooth, ZigBee, etc.).

The plurality of baseband transmitter components may include one or more scrambling circuits, one or more puncturing circuits, one or more encoding circuits, one or more interleaving circuits, one or more constellation mapping circuits, one or more modulation circuits, one or more frequency spreading circuits, one or more frequency hopping circuits, one or more beamforming circuits, one or more space-time-block encoding circuits, one or more space-frequency-block encoding circuits, one or more frequency to time domain conversion circuits, and/or one or more digital baseband to intermediate frequency conversion circuits. The plurality of baseband transmitter components may be configured into one or transmitter paths that support the same or different wireless communication protocols (e.g., GSM, CDMA, WCDMA, HSUPA, HSDPA, WiMAX, EDGE, GPRS, universal mobile telecommunications system (UMTS), long term evolution (LTE), IEEE 802.16, evolution data optimized (EV-DO), IEEE 802.11, Bluetooth, ZigBee, etc.).

In an example of operation, the baseband processing module is operable to convert outbound data (e.g., voice, audio, video, text, graphics, messaging, etc.) into an outbound symbol stream in accordance with one of a plurality of communication standards. The baseband processing module 35 then transmits the outbound symbol stream to the at least a portion of a configured transmitter. In addition, the baseband processing module 35 receives an inbound symbol stream from the at least a portion of a configured receiver. The baseband processing module then converts the inbound symbol stream into inbound data (e.g., voice, audio, video, text, graphics, messaging, etc.) in accordance with the one of the plurality of communication standards.

In another example of operation, the baseband processing module 35 is further operable to generate the configuration information for the configured transmitter and/or the configured receiver based on the one of the plurality of communication standards. Note that the baseband processing module 35 may generate configuration information to configure multiple transmitters and/or receivers in accordance with multiple standards.

In yet another example of operation, the baseband processing module is further operable to monitor performance of the at least a portion of the configured receiver and/or of the at least a portion of the configured transmitter to produce performance data (e.g., signal strength, interference, power levels, etc.) The baseband processing module 35 updates the configuration information when the performance data compares unfavorably to desired performance data such that the at least a portion of the receiver and/or of the at least a portion of the transmitter is at least partially reconfigured.

Figure 26:
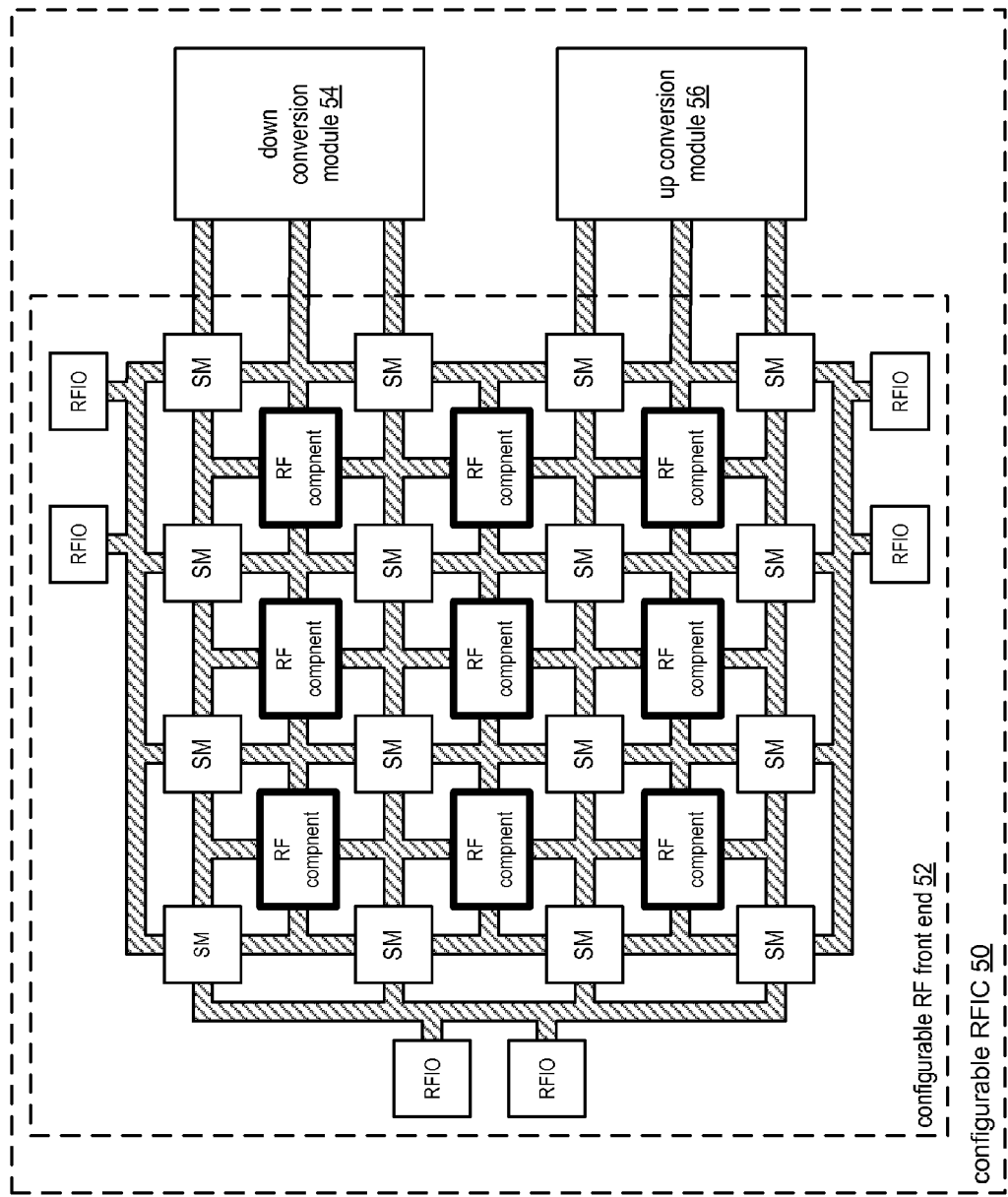
FIG. 26 is a schematic block diagram of an embodiment of a configurable RFIC in accordance with the present invention.

FIG. 26 is a schematic block diagram of an embodiment of a configurable RFIC 50 that includes a configurable RF front-end 52, a down conversion module 54, and an up conversion module 56. The configurable RF front-end 52 includes a plurality of switch modules (SM), a plurality of RF components, and at least one RF input/output (IO) module (RFIO).

In an example of operation, the configurable RF front end configures a receiver front-end from the plurality of RF components in accordance with configuration information to produce a configured receiver front-end and configures a transmitter front-end from the plurality of RF components in accordance with the configuration information to produce a configured transmitter front-end. Note that the configuration information is derived in accordance with one of a plurality of standards. Further note that the configurable RF front end may configure multiple receiver front-end and multiple transmitter front ends to support MIMO operation, multiple standards operation, and/or a combination thereof.

The configured receiver front-end receives an inbound RF signal. The configured receiver front-end performs one or more of impedance matching, RF bandpass filtering, amplification, single-ended to differential conversion, and blocking on the inbound RF signal to produce a receiver front-end processed RF signal(s).

The down conversion module 54 converts the receiver front-end processed RF signal(s) into an inbound symbol stream(s). In an embodiment, the down conversion module 54 mixes in-phase (I) and quadrature (Q) components of the receiver front-end processed RF signal(s) with in-phase and quadrature components of receiver local oscillation(s) to produce a mixed I signal(s) and a mixed Q signal(s). Each pair of the mixed I and Q signals are combined to produce the inbound symbol stream(s). In this embodiment, the inbound symbol stream includes phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal(s) includes amplitude information (e.g., $+/-\Delta A$ [amplitude shift] and/or $A(t)$ [amplitude modulation]). To recover the amplitude information, the down conversion module 54 further includes an amplitude detector such as an envelope detector, a low pass filter, etc.

The up conversion module 56 converts an outbound symbol stream into the up-converted signal. Within the up conversion module 56, a transmit mixer module mixes the outbound symbol stream with a transmit local oscillation to produce an up-converted signal. This may be done in a variety of ways. In an embodiment, in-phase and quadrature components of the outbound symbol stream are mixed with in-phase and quadrature components of the transmit local oscillation to produce the up-converted signal. In another embodiment, the outbound symbol stream provides phase information (e.g., +/−Δθ [phase shift] and/or θ(t) [phase modulation]) that adjusts the phase of the transmit local oscillation to produce a phase adjusted up-converted signal. In this embodiment, the phase adjusted up-converted signal provides the up-converted signal. In another embodiment, the outbound symbol stream further includes amplitude information (e.g., A(t) [amplitude modulation]), which is used to adjust the amplitude of the phase adjusted up converted signal to produce the up-converted signal. In yet another embodiment, the outbound symbol stream provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In another embodiment, the outbound symbol stream further includes amplitude information, which is used to adjust the amplitude of the frequency adjusted up-converted signal to produce the up-converted signal. In a further embodiment, the outbound baseband symbol stream provides amplitude information (e.g., +/−ΔA [amplitude shift] and/or A(t) [amplitude modulation]) that adjusts the amplitude of the transmit local oscillation to produce the up-converted signal.

The configured transmitter front-end receives the up-converted signal. The configured transmitter front-end perform at least one of power amplification, amplitude modulation, RF bandpass filtering, differential to single-ended conversion, and impedance matching on the up-converted signal to produce the outbound RF signal.

In another embodiment, the configured receiver front-end performs at least one of impedance matching, RF bandpass filtering, amplification, single-ended to differential conversion, and blocking on the inbound RF signal to produce a processed inbound RF signal. The configured receiver front-end then converts a carrier frequency of the inbound RF signal to frequency corresponding to a local oscillation of the down conversion module to produce the receiver front-end processed RF signal.

In addition, the configured transmitter front-end converts a carrier frequency of the up-converted signal from a frequency corresponding to a local oscillation of the up conversion module to a desired RF carrier frequency to produce a second up-converted signal. The configured transmitter front-end then performs at least one of power amplification, amplitude modulation, RF bandpass filtering, differential to single-ended conversion, and impedance matching on the second up-converted signal to produce the outbound RF signal.

In an embodiment, the plurality of RF components includes a plurality of RF receiver components, a plurality of RF transmitter component, and/or a plurality of RF common components. The plurality of RF receiver components may include one or more receiver antenna interface circuits, one or more low noise amplifiers, one or more receiver RF filters, one or more blocking circuits, one or more intermediate frequency (IF) receiver mixers, and/or one or more IF receiver local oscillators. The plurality of RF transmitter components may include one or more IF transmitter mixers, one or more IF transmitter local oscillators, one or more transmitter summing units, one or more transmitter complex filters, one or more power amplifiers, one or more transmitter RF filters, and/or one or more transmitter antenna interface circuits. The plurality of RF common components may include one or more antenna interface circuits, one or more transformer baluns, one or more transmit/receive switches, and one or more transceiver RF filters.

Figure 27:
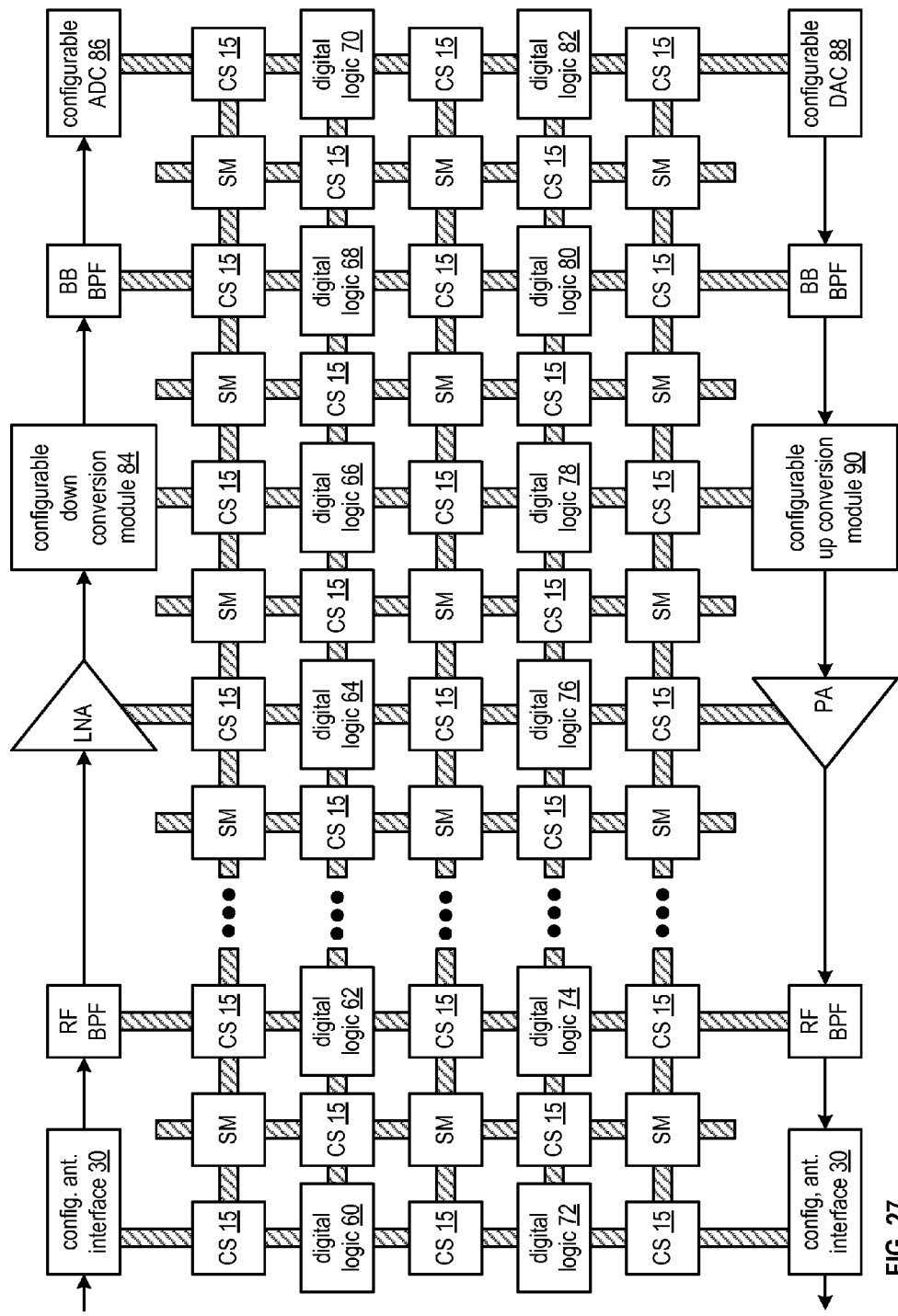
FIG. 27 is a schematic block diagram of another embodiment of a configurable RFIC in accordance with the present invention.

FIG. 27 is a schematic block diagram of another embodiment of a configurable RFIC the includes one or more configuration RF receiver paths, one or more configurable RF transmitter paths, a plurality of digital logic blocks 60-82, a plurality of switching modules (SM), and a plurality of connection switches 15. A configurable RF receiver path includes a configurable antenna interface 30, an RF bandpass filter (BPF), a low noise amplifier (LNA), a configurable down conversion module 84, a baseband (BB) bandpass filter (BPF), and a configurable analog to digital converter (ADC) 86. A configurable RF transmitter path includes a configurable digital to analog converter (DAC) 88, a baseband bandpass filter (BB BPF), a configurable upconversion module 90, a power amplifier (PA), an RF bandpass filter (BPF), and a configurable antenna interface 30. Note the RF transmitter path and the RF receiver path may share a configurable antenna interface 30 or have separate configurable antenna interface 30.

A digital logic block 60-82 may include one or more digital logic elements (e.g., logic gates (e.g., AND, OR, NAND, NOR, XOR, etc.) digital shift registers, multipliers, adders, inverters, registers, digital filters (e.g., finite impulse response, infinite impulse response, low pass, high pass, bandpass, etc.), etc.). A digital logic block 60-82 may also include more complex digital circuitry, such as a micro-controller, a digital signal processor, a configurable logic block, state machine, and/or any device that manipulates signals (analog and/or digital) based on hard coding of the circuitry and/or operational instructions.

The configurable down conversion module 84 may be implemented in a variety of ways, some of which have been discussed with reference to FIGS. 4-11. The configurable up conversion module 90 may be implemented in a variety of ways, some of which have been discussed with reference to FIGS. 19-24. The configurable ADC 86 may include one or more analog to digital conversion options for bit resolution, input range, filtering, etc. For example, a basic sigma-delta ADC may be modified by utilizing one or more of the digital logic blocks to adjust the digital bit resolution, the digital filter, etc. Similarly, the configurable DAC 88 may include one or more digital to analog conversion options for filtering, digital input bandwidth, etc.

In this embodiment, one or more of the digital logic blocks may be configured to perform digital functions for the RF receiver path and/or RF transmit path. The digital functions include, but are not limited to, local oscillation correction, DC offset correction, forward error correction, transmit power detection and/or correction, receive signal strength indication, local oscillation adjustments, tuning of RF components, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A configurable radio frequency (RF) transceiver integrated circuit (IC) comprises:
    an RF input/output (IO) module;
    a plurality of switching modules;
    a plurality of components comprising a plurality of RF transmitter specific components and a plurality of RF receiver specific components, wherein, based on a configuration instruction, the RF IO module and selected components of the plurality of components are inter-connected via the at least some of the plurality of switching modules to produce at least a portion of a RF receiver and at least a portion of a RF transmitter; and
    a second RF IO module, wherein based on second configuration information, the second RF IO module and second selected components of the plurality of components are interconnected via the at least a second some of the plurality of switching modules to produce at least a portion of a second transceiver, wherein, based on multiple input multiple output (MIMO) configuration information, the RF IO module, the second RF IO module, and MIMO selected components of the plurality of components are inter-connected via the at least a MIMO some of the plurality of switching modules to produce at least a portion of a MIMO transceiver.

2. The configurable RF transceiver IC of claim 1 further comprises at least one of:
    the plurality of receiver components including at least some of: one or more receiver antenna interface circuits, one or more low noise amplifiers, one or more receiver RF filters, one or more blocking circuits, one or more receiver mixers, one or more receiver summing units, one or more receiver baseband filters, one or more receiver complex filters, one or more analog to digital converters, and one or more receiver local oscillators;
    the plurality of transmitter components including at least some of: one or more digital to analog converters, one or more transmitter baseband filters, one or more transmitter mixers, one or more transmitter local oscillators, one or more transmitter summing units, one or more transmitter complex filters, one or more power amplifiers, one or more transmitter RF filters, and one or more transmitter antenna interface circuits; and
    the plurality of common components including at least some of: one or more antenna interface circuits, one or more transformer baluns, one or more transmit/receive switches, one or more transceiver RF filters, one or more digital logic blocks, and one or more transceiver local oscillators.

3. The configurable RF transceiver IC of claim 1, wherein the plurality of components comprises at least one of:
    a plurality of fixed circuits;
    a plurality of adjustable circuits; and
    a plurality of circuit elements.

4. The configurable RF transceiver IC of claim 1, wherein the RF input/output (IO) module comprises:
    one or more RF input modules; and
    one or more RF output modules.

5. The configurable RF transceiver IC of claim 1 further comprises:
    a baseband processing module operable to:
        convert outbound data into an outbound symbol stream in accordance with one of a plurality of communication standards;
        transmit the outbound symbol stream to the at least a portion of the transmitter;
        receive an inbound symbol stream from the at least a portion of the receiver; and
        convert the inbound symbol stream into inbound data in accordance with the one of the plurality of communication standards.

6. The configurable RF transceiver IC of claim 5, wherein the baseband processing module is further operable to:
    generate the configuration information based on the one of the plurality of communication standards;
    monitor performance of at least one of: the at least a portion of the receiver and of the at least a portion of the transmitter to produce performance data; and
    when the performance data compares unfavorably to desired performance data, update the configuration information such that at least one of the at least a portion of the receiver and of the at least a portion of the transmitter is at least partially reconfigured.

7. The configurable RF transceiver IC of claim 5, wherein the baseband processing module comprises:
   a plurality of baseband transmitter components; and
   a plurality of baseband receiver components, wherein, based on a baseband configuration instruction, selected components of the plurality of baseband transmitter components are interconnected via a first some of the plurality of switching modules to produce a baseband transmitter and selected components of the plurality of receiver components are inter-connected via a second some of the plurality of switching modules to produce a baseband receiver.

8. The configurable RF transceiver IC of claim 1, wherein the MIMO transceiver is operable to support IEEE 802.11 communications.

9. A configurable radio frequency (RF) front-end integrated circuit (IC) comprises:
   an RF input/output (IO) module having at least one RF connection and a plurality of selectable connections;
   a plurality of switching modules, wherein a switching module of the plurality of switching modules includes a first plurality of connection lines, a second plurality of plurality of connection lines, a third plurality of connection lines, a fourth plurality of connection lines; a first switching unit operable to couple a first connection line of the first plurality of connections lines to one of a first connection line of the second plurality of connection lines, a first connection line of the third plurality of connection lines, or a first connection line of the fourth plurality of connection lines, and a second switching unit operable to couple a second connection line of the first plurality of connections lines to one of a second connection line of the second plurality of connection lines, a second connection line of the third plurality of connection lines, or a second connection line of the fourth plurality of connection lines; and
   a plurality of RF components, wherein at least a first RF component of the plurality of RF components is coupled to at least a first one of the plurality of switching modules and at least a second RF component of the plurality of RF components is coupled to at least a second one of the plurality of switching modules, and wherein, based on a front-end configuration instruction, the RF IO module, the at least first RF component, and the at least second RF component are inter-connected via the at least a first one and the at least a second one of the plurality of switching modules to produce an RF front-end.

10. The configurable RF front-end IC of claim 9, wherein the plurality of RF components comprises at least one of:
   a plurality of RF receiver components;
   a plurality of RF transmitter components; and
   a plurality of RF common components.

11. The configurable RF front-end IC of claim 10 further comprises at least one of:
   the plurality of RF receiver components including at least some of: one or more receiver antenna interface circuits, one or more low noise amplifiers, one or more receiver RF filters, one or more blocking circuits, one or more intermediate frequency (IF) receiver mixers, one or more analog to digital converters, and one or more IF receiver local oscillators;
   the plurality of RF transmitter components including at least some of: one or more digital to analog converters, one or more IF transmitter mixers, one or more IF transmitter local oscillators, one or more transmitter summing units, one or more transmitter complex filters, one or more power amplifiers, one or more transmitter RF filters, and one or more transmitter antenna interface circuits; and
   the plurality of RF common components including at least some of: one or more antenna interface circuits, one or more transformer baluns, one or more transmit/receive switches, one or more digital logic blocks, and one or more transceiver RF filters.

12. The configurable RF front-end IC of claim 9, wherein the RF input/output (IO) module comprises:
   one or more RF input modules; and
   one or more RF output modules.

13. The configurable RF front-end IC of claim 9 further comprises:
   a second RF IO module, wherein, based on the front-end configuration instruction, the RF IO module, the at least a first RF component, and the at least a second RF component are inter-connected via the at least a first one and the at least a second one of the plurality of switching modules to produce the RF front-end, wherein, based on second configuration information, the second RF IO module, at least a third RF component of the plurality of RF components, and at least a fourth RF component of the plurality of RF components are inter-connected via at least a some of the plurality of switching modules to produce at least a portion of a second RF front-end; and
   wherein, based on multiple input multiple output (MIMO) configuration information, the RF IO module, the second RF IO module, and MIMO selected RF components of the plurality of RF components are inter-connected via the at least a MIMO some of the plurality of switching modules to produce at least a portion of a MIMO front-end.

14. The configurable RF transceiver IC of claim 9, wherein the RF front-end is operable to support IEEE 802.11 communications.

15. A configurable radio frequency integrated circuit (RFIC) comprises:
   a configurable radio frequency (RF) front end comprising a plurality of RF components including a plurality of RF transmitter specific components and a plurality of RF receiver specific components, the configurable RF front end comprising:
      an RF input/output (IO) module having at least one RF connection and a plurality of selectable connections;
      a plurality of switching modules, wherein a switching module of the plurality of switching modules includes a first plurality of connection lines, a second plurality of plurality of connection lines, a third plurality of connection lines, a fourth plurality of connection lines;
      a first switching unit operable to couple a first connection line of the first plurality of connections lines to one of a first connection line of the second plurality of connection lines, a first connection line of the third plurality of connection lines, or a first connection line of the fourth plurality of connection lines, and a second switching unit operable to couple a second connection line of the first plurality of connections lines to one of a second connection line of the second plurality of connection lines, a second connection line of the third plurality of connection lines, or a second connection line of the fourth plurality of connection lines; and wherein at least a first RF component of the plurality of RF components is coupled to at least a first one of the plurality of switching modules and at least a second RF component of the plurality of RF components is coupled to at least a second one of the plurality of switching modules, and wherein, based on the configuration instruction, the RF IO module, the at least first RF component, and the at least second RF component are inter-connected via the at least a first one and the at least a second one of the plurality of switching modules to produce the configured receiver RF front-end or the configured transmitter RF front-end and the configurable RF front end operable to:
configure a receiver front-end from the plurality of RF components in accordance with configuration information to produce a configured receiver front-end, wherein the configuration information is derived in accordance with one of a plurality of standards, wherein the configured receiver front-end is operable to:
receive an inbound RF signal; and
perform at least one of impedance matching, RF bandpass filtering, amplification, single-ended to differential conversion, and blocking on the inbound RF signal to produce a receiver front-end processed RF signal;
configure a transmitter front-end from the plurality of RF components in accordance with the configuration information to produce a configured transmitter front-end, wherein the configured transmitter front-end is operable to:
receive an up-converted signal; and
perform at least one of power amplification, amplitude modulation, RF bandpass filtering, differential to single-ended conversion, and impedance matching on the up-converted signal to produce an outbound RF signal;
a down conversion module operable to convert the receiver front-end processed RF signal into an inbound symbol stream in accordance with one or more wireless communication protocols; and
an up conversion module operable to convert an outbound symbol stream into the upconverted signal in accordance with the one or more wireless communication protocols.

16. The configurable RFIC of claim 15 further comprises:
the configured receiver front-end is operable to:
perform the at least one of impedance matching, RF bandpass filtering, amplification, single-ended to differential conversion, and blocking on the inbound RF signal to produce a processed inbound RF signal; and
convert carrier frequency of the inbound RF signal to frequency corresponding to a local oscillation of the down conversion module to produce the receiver frontend processed RF signal; and
the configured transmitter front-end is operable to:
receive the up-converted signal;
convert carrier frequency of the up-converted signal from a frequency corresponding to a local oscillation of the up conversion module to a desired RF carrier frequency to produce a second up-converted signal; and
perform the at least one of power amplification, amplitude modulation, RF bandpass filtering, differential to single-ended conversion, and impedance matching on the second up-converted signal to produce the outbound RF signal.

17. The configurable RFIC of claim 15 further comprises:
the configurable RF front end further operable to:
configure a second receiver front-end from the plurality of RF components in accordance with second configuration information to produce a second configured receiver front-end, wherein the second configuration information is derived in accordance with a second one of a plurality of standards, wherein the second configured receiver front-end is operable to:
receive a second inbound RF signal; and
perform at least one of impedance matching, RF bandpass filtering, amplification, single-ended to differential conversion, and blocking on the second inbound RF signal to produce a second receiver front-end processed RF signal;
configure a second transmitter front-end from the plurality of RF components in accordance with the second configuration information to produce a second configured transmitter front-end, wherein the second configured transmitter frontend is operable to:
receive a second up-converted signal; and
perform at least one of power amplification, amplitude modulation, RF bandpass filtering, differential to single-ended conversion, and impedance matching on the second up-converted signal to produce a second outbound RF signal;
the down conversion module operable to convert the second receiver front-end processed RF signal into a second inbound symbol stream in accordance with the one or more wireless communication protocols; and
the up conversion operable to convert a second outbound symbol stream into the second up-converted signal in accordance with the one or more wireless communication protocols.

18. The configurable RFIC of claim 15, wherein the plurality of RF components comprises at least one of:
a plurality of RF receiver components;
a plurality of RF transmitter components; and
a plurality of RF common components.

19. The configurable RFIC of claim 15 further comprises at least one of:
the plurality of RF receiver components including at least some of: one or more receiver antenna interface circuits, one or more low noise amplifiers, one or more receiver RF filters, one or more blocking circuits, one or more intermediate frequency (IF) receiver mixers, one or more analog to digital converters, and one or more IF receiver local oscillators;
the plurality of RF transmitter components including at least some of: one or more digital to analog converters, one or more IF transmitter mixers, one or more IF transmitter local oscillators, one or more transmitter summing units, one or more transmitter complex filters, one or more power amplifiers, one or more transmitter RF filters, and one or more transmitter antenna interface circuits; and
the plurality of RF common components including at least some of: one or more antenna interface circuits, one or more transformer baluns, one or more transmit/receive switches, one or more digital logic blocks, and one or more transceiver RF filters.

20. The configurable RF transceiver IC of claim 15, wherein the receiver RF front-end is operable to support IEEE 802.11 communications.

* * * * *

UNITED STATES PATENT AND TRADEMARK OFFICE
CERTIFICATE OF CORRECTION

PATENT NO. : 8,320,844 B2  
APPLICATION NO. : 12/504756  
DATED : November 27, 2012  
INVENTOR(S) : Ibrahim et al.

Page 1 of 1

It is certified that error appears in the above-identified patent and that said Letters Patent is hereby corrected as shown below:

In the Claims

Col. 23, line 25, in claim 9: after "a second" delete "plurality of"  
Col. 23, line 29, in claim 9: replace "connections" with --connection--  
Col. 24, line 52, in claim 15: after "of" delete "plurality of"

Signed and Sealed this  
First Day of October, 2013

Teresa Stanek Rea  
*Deputy Director of the United States Patent and Trademark Office*